United States Patent
Scott et al.

(10) Patent No.: US 9,942,892 B2
(45) Date of Patent: Apr. 10, 2018

(54) SELF-OPTIMIZING MOBILE SATELLITE SYSTEMS

(71) Applicant: THE BOEING COMPANY, Chicago, IL (US)

(72) Inventors: James P. Scott, Chicago, IL (US); Ying J. Feria, Chicago, IL (US); Wes Wang, Chicago, IL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/502,802

(22) Filed: Sep. 30, 2014

(65) Prior Publication Data
US 2016/0095109 A1  Mar. 31, 2016

(51) Int. Cl.
H04L 12/28 (2006.01)
H04W 72/04 (2009.01)
H04W 24/08 (2009.01)
H04B 7/185 (2006.01)
H04W 84/06 (2009.01)

(52) U.S. Cl.
CPC .... *H04W 72/0433* (2013.01); *H04B 7/18519* (2013.01); *H04B 7/18539* (2013.01); *H04W 24/08* (2013.01); *H04W 72/0473* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 5,898,681 A | * | 4/1999 | Dutta | H04B 7/18539 370/229 |
| 7,177,649 B1 | * | 2/2007 | Nielsen | H04W 48/20 370/332 |
| 8,712,438 B1 | * | 4/2014 | McMullen | H04M 3/42 342/457 |
| 2004/0072539 A1 | * | 4/2004 | Monte | H04B 7/18563 455/13.4 |

(Continued)

FOREIGN PATENT DOCUMENTS

WO  01/41548 A2  6/2001

OTHER PUBLICATIONS

3GPP Technical Specification 36.902, Release 9, Version 9.3.1, available at http://www.3gpp.org/dynareport/36902.htm, Apr. 7, 2011.

(Continued)

*Primary Examiner* — Nicholas Sloms
(74) *Attorney, Agent, or Firm* — Haynes and Boone, LLP

(57) ABSTRACT

Systems, methods, and apparatus for self-optimizing Mobile Satellite System (MSS) resources are disclosed. In one or more embodiments, the disclosed method involves determining, with at least one processor, a communication demand for at least one cell in a MSS network. The method further involves determining, with at least one processor, whether the communication demand for at least one cell exceeds the capacity threshold for at least one cell. Further, the method involves reallocating, with at least one processor, when the communication demand for at least one cell exceeds the capacity threshold for at least one cell, at least a portion of the MSS resources such that at least one cell is able to meet the communication demand.

18 Claims, 22 Drawing Sheets

(56) References Cited

U.S. PATENT DOCUMENTS

| | | | |
|---|---|---|---|
| 2006/0068848 A1* | 3/2006 | Shapira | H01Q 1/246 455/562.1 |
| 2009/0298554 A1* | 12/2009 | Kim | H01M 10/465 455/574 |
| 2010/0309828 A1 | 12/2010 | Nguyen et al. | |
| 2011/0244870 A1* | 10/2011 | Lee | H04W 52/244 455/444 |
| 2012/0178473 A1* | 7/2012 | Wiren | G01S 5/0009 455/456.2 |
| 2012/0208581 A1* | 8/2012 | Ishida | H04B 7/0691 455/509 |
| 2013/0009809 A1 | 1/2013 | Bert et al. | |
| 2013/0244570 A1 | 9/2013 | Park | |
| 2014/0011503 A1* | 1/2014 | Du | H04W 16/24 455/448 |
| 2014/0036656 A1* | 2/2014 | Chou | H04W 24/04 370/216 |
| 2014/0057638 A1* | 2/2014 | Carey | H04W 16/18 455/446 |
| 2014/0064247 A1* | 3/2014 | Teyeb | H04W 36/0083 370/331 |
| 2014/0219255 A1* | 8/2014 | Eyuboglu | H04W 72/12 370/336 |
| 2014/0233611 A1* | 8/2014 | Beeler | H04B 7/18519 375/211 |
| 2015/0036597 A1* | 2/2015 | Chou | H04W 52/243 370/329 |
| 2015/0045061 A1* | 2/2015 | Da | H04W 4/023 455/456.2 |
| 2015/0126204 A1* | 5/2015 | Rodriguez Crespo | H04W 16/18 455/446 |
| 2015/0147959 A1* | 5/2015 | Ha | H04B 7/185 455/13.1 |
| 2015/0327178 A1* | 11/2015 | Hennelly | H04W 52/0245 370/311 |
| 2016/0066312 A1* | 3/2016 | Centonza | H04W 72/0426 370/329 |
| 2016/0183099 A1* | 6/2016 | Frenger | H04W 16/24 370/311 |

OTHER PUBLICATIONS

Extended European Search Report, Application No. 15187550.7-1855, dated Feb. 24, 2016.

* cited by examiner

FIG. 11

| Scenario | Call Blocking (%) | Throughput (Total Sessions) | Capacity (Total Utilization) |
|---|---|---|---|
| Baseline | 42.60% | 112 Sessions | 16.00% |
| Carrier Shaping | 3.68% | 335 Sessions | 47.89% |
| Cell Shaping | 1.38% | 349 Sessions | 49.86% |

1100

(12)  United States Patent

SELF-OPTIMIZING MOBILE SATELLITE SYSTEMS

FIELD

The present disclosure relates to Mobile Satellite Systems (MSS). In particular, it relates to self-optimizing cellular MSS networks.

BACKGROUND

Currently, when cells in a MSS experience traffic congestion, an open loop approach to allocation of Radio Access Network (RAN) resources is used to respond. This open loop approach implies that manual intervention by a system operator is required in order to respond to the transient periods of congestion in the network. Manual intervention by system operators is labor intensive and time consuming and, as such, the system operators are unable to quickly respond to these transient periods of traffic congestion in the network.

As such, there is a need for an improved method for self-optimizing MSS resources.

SUMMARY

The present disclosure relates to a method, system, and apparatus for self-optimizing MSS networks. In one or more embodiments, a method for self-optimizing MSS resources involves determining, with at least one processor, the communication demand for at least one cell in a MSS network. The method further involves determining, with at least one processor, whether the communication demand for at least one cell exceeds the capacity threshold for at least one cell. Further, the method involves reallocating, with at least one processor, when the communication demand for at least one cell exceeds the capacity threshold for at least one cell, at least a portion of the MSS resources such that at least one cell is able to meet the communication demand.

In one or more embodiments, the reallocating of at least a portion of the MSS resources comprises allocating at least one communication resource (e.g., at least one transmission frequency carrier, at least one receive frequency carrier) from at least one adjacent cell to at least one cell.

In at least one embodiment, the reallocating of at least a portion of the MSS resources comprises redefining a shape of at least one adjacent cell to at least one cell. In some embodiments, the redefining of the shape of at least one adjacent cell comprises redefining at least one vertex of at least one adjacent cell.

In one or more embodiments, the reallocating of at least a portion of the MSS resources comprises redefining a cell type of at least one cell. In some embodiments, the cell type is one of a standard spot cell, a micro cell, or a regional cell. In one or more embodiments, the cell type comprises cells of the same size and/or cells of different sizes.

In at least one embodiment, the reallocating of at least a portion of the MSS resources comprises allocating greater effective isotropic radiation power (EIRP) to at least one cell. In some embodiments, the reallocating of at least a portion of the MSS resources comprises allocating greater gain over temperature (G/T) to at least one cell.

In one or more embodiments, the capacity threshold for at least one cell is related to available frequency bandwidth of at least one cell. In some embodiments, the capacity threshold for at least one cell is predetermined. In one or more embodiments, the capacity threshold for at least one cell can be changed dynamically over time.

In at least one embodiment, at least one cell may be a regular shape (e.g., a square, a polygon, a circle, a triangle, etc.) or an irregular shape (i.e. a shape having sides of different lengths and/or angles of different sizes). In some embodiments, the reallocating of at least a portion of the MSS resources occurs without a handover event.

In at least one embodiment, a system for self-optimizing MSS resources involves at least one processor to determine the communication demand for at least one cell in a MSS network; to determine whether the communication demand for at least one cell exceeds the capacity threshold for at least one cell; and to reallocate, when the communication demand for at least one cell exceeds the capacity threshold for at least one cell, at least a portion of the MSS resources such that at least one cell is able to meet the communication demand.

In one or more embodiments, when at least one processor is to reallocate at least a portion of the MSS resources, at least one processor is to allocate at least one communication resource from at least one adjacent cell to at least one cell.

In at least one embodiment, when at least one processor is to reallocate at least a portion of the MSS resources, at least one processor is to redefine a shape of at least one adjacent cell to at least one cell. In some embodiments, when at least one processor is to redefine the shape of at least one adjacent cell, at least one processor is to redefine at least one vertex of at least one adjacent cell.

In one or more embodiments, when at least one processor is to reallocate at least a portion of the MSS resources, at least one processor is to redefine a cell type of at least one cell. In some embodiments, the cell type is one of a standard spot cell, a micro cell, or a regional cell.

In at least one embodiment, when at least one processor is to reallocate at least a portion of the MSS resources, at least one processor is to allocate greater effective isotropic radiation power (EIRP) to at least one cell. In some embodiments, when at least one processor is to reallocate at least a portion of the MSS resources, at least one processor is to allocate greater gain over temperature (G/T) to at least one cell.

In one or more embodiments, the capacity threshold for at least one cell is related to available frequency bandwidth of at least one cell. In some embodiments, the capacity threshold for at least one cell is predetermined. In at least one embodiment, the capacity threshold for at least one cell can be changed dynamically over time.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

Figure 6:
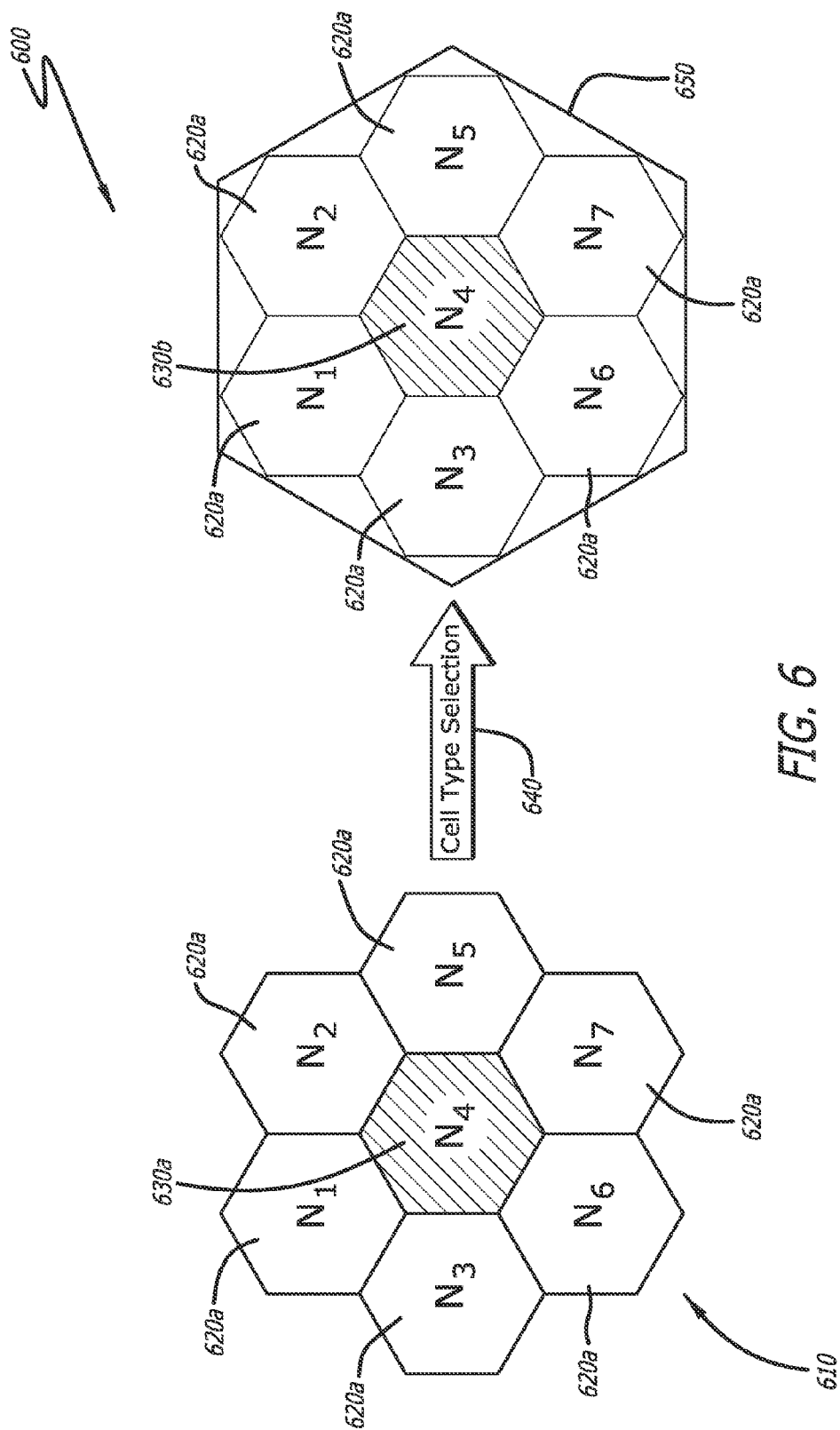
FIG. 6 is a diagram illustrating cell type selection that may be employed by the disclosed system and method for self-optimizing MSS resources, in accordance with at least one embodiment of the present disclosure.
Figure 7A:
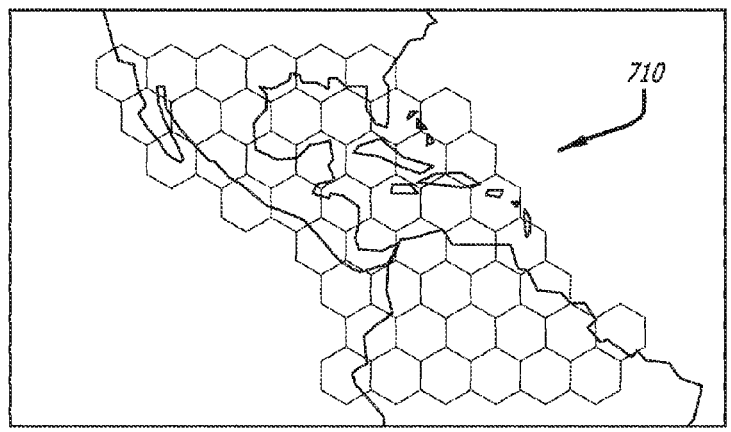
Figure 7B:
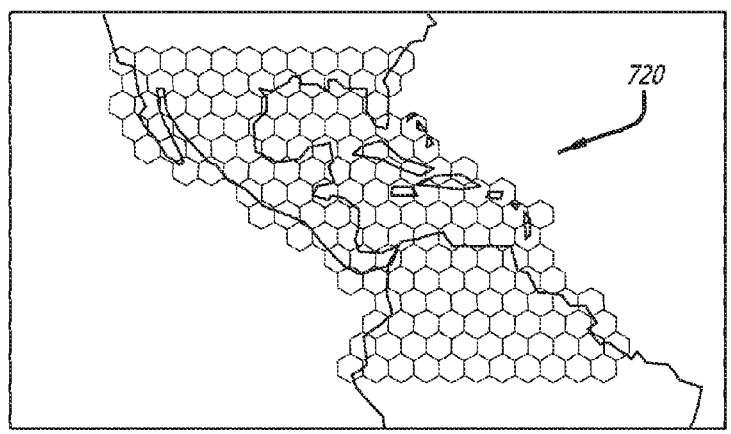
Figure 7C:
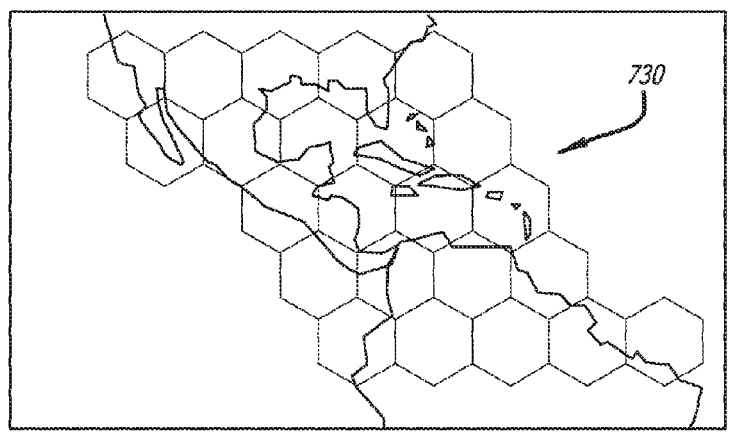

FIGS. 7A, 7B, and 7C are diagrams showing different exemplary cell types that may be used for the cell type selection of FIG. 6, in accordance with at least one embodiment of the present disclosure.

Figure 8A:
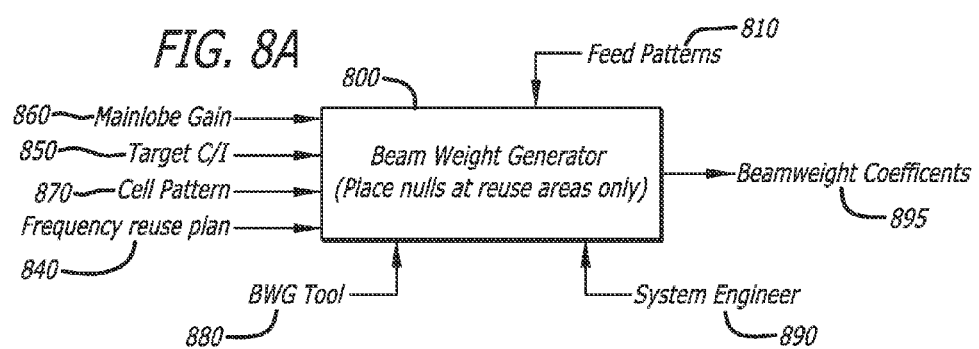
Figure 8B:
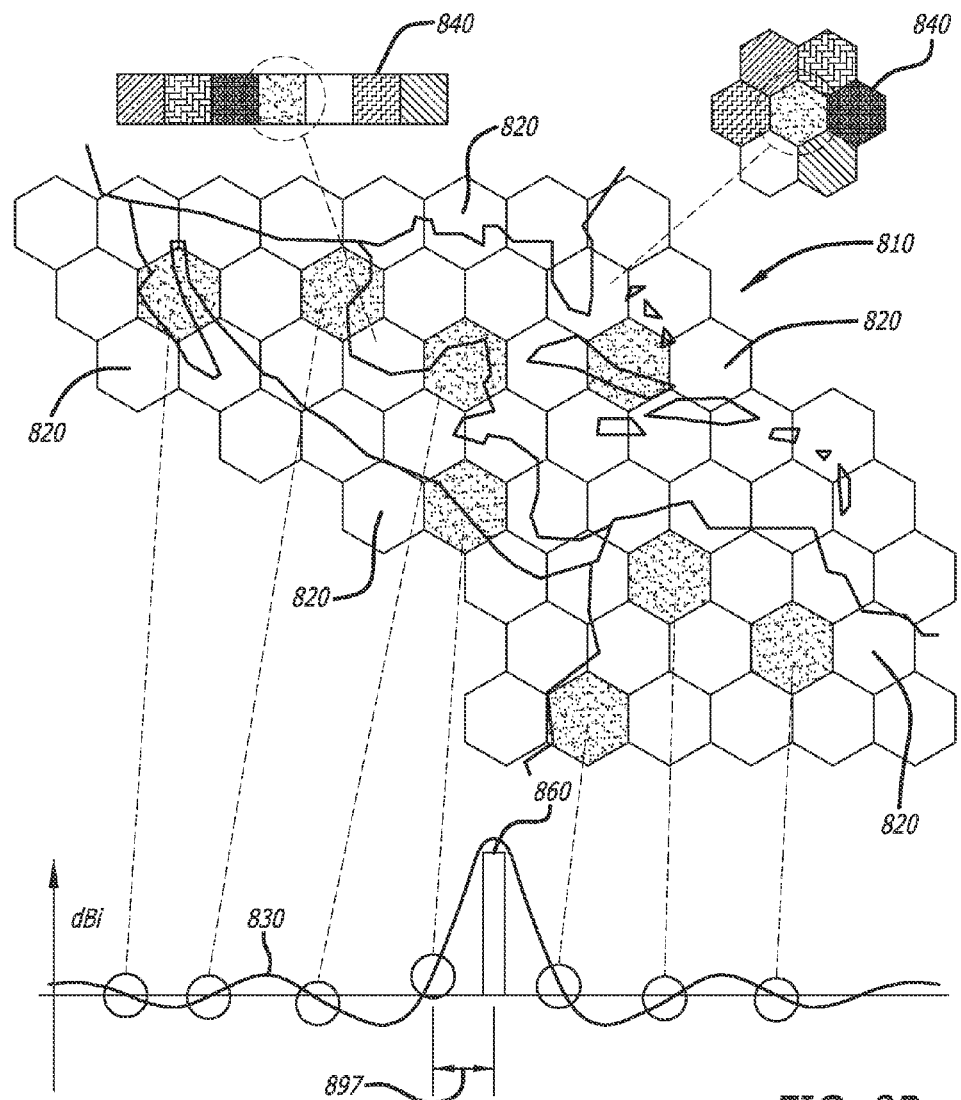

FIGS. 8A and 8B are diagrams illustrating beam shaping that may be employed by the disclosed system and method for self-optimizing MSS resources, in accordance with at least one embodiment of the present disclosure.

Figure 4:
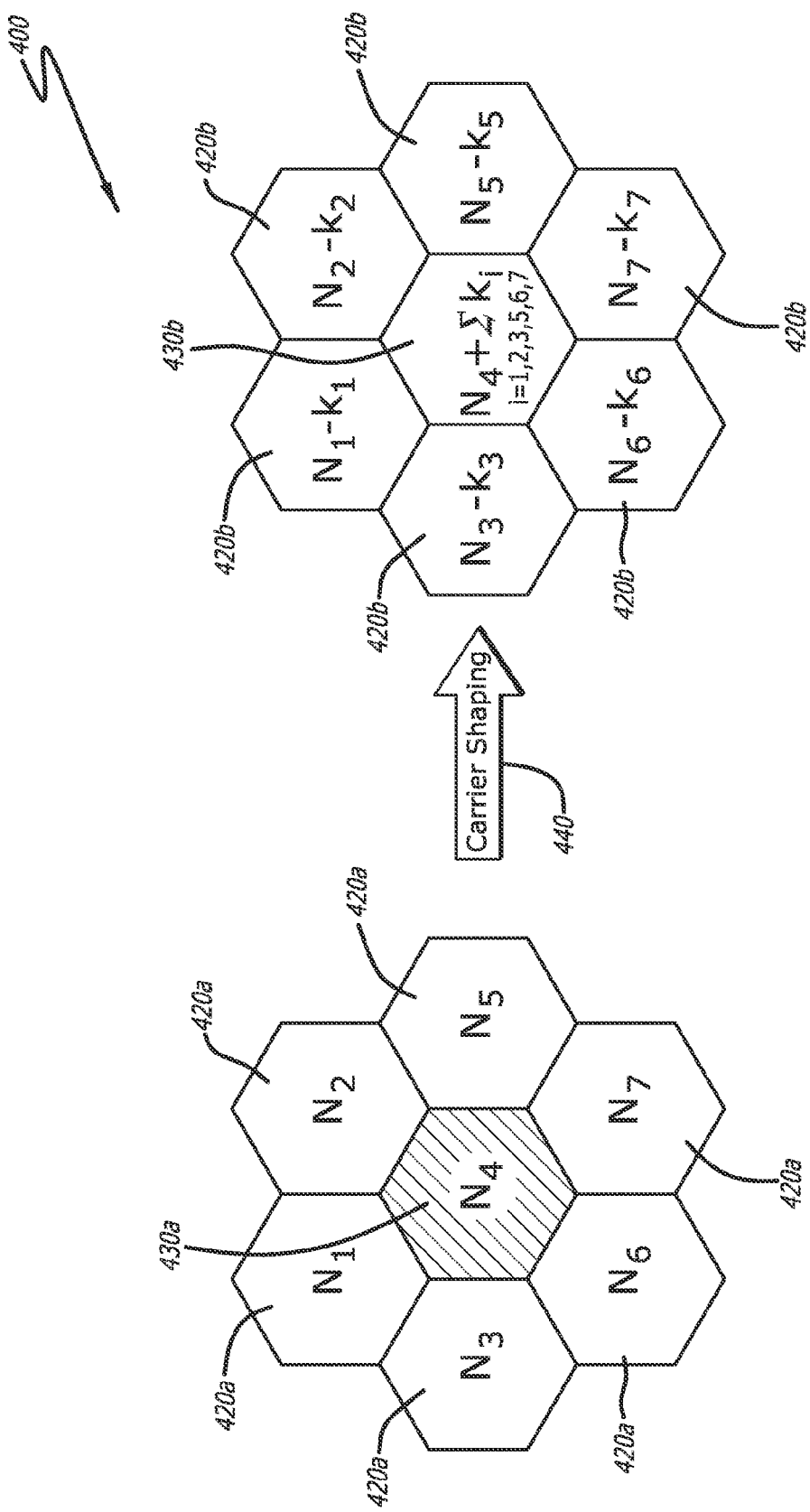
FIG. 4 is a diagram illustrating carrier shaping that may be employed by the disclosed system and method for self-optimizing MSS resources, in accordance with at least one embodiment of the present disclosure.

FIGS. 9A-9F show data for a simulation study of an exemplary case using carrier shaping of FIG. 4, in accordance with at least one embodiment of the present disclosure.

Figure 5:
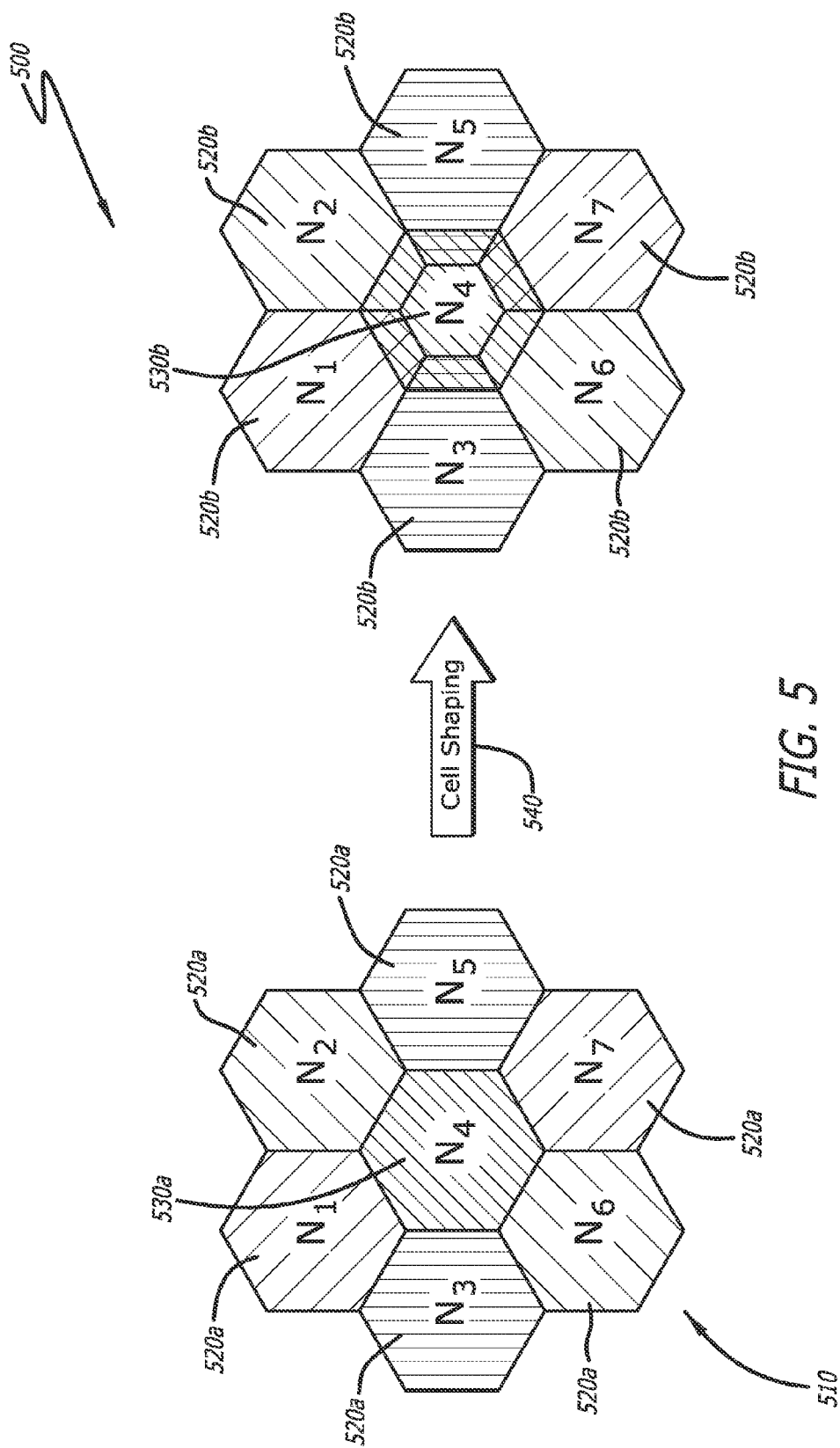
FIG. 5 is a diagram illustrating cell shaping that may be employed by the disclosed system and method for self-optimizing MSS resources, in accordance with at least one embodiment of the present disclosure.

FIGS. 10A-10F show data for a simulation study of an exemplary case using cell shaping of FIG. 5, in accordance with at least one embodiment of the present disclosure.

FIG. 11 is a table showing a summary of the improvement in cell congestion for the simulation study of the exemplary case using carrier shaping of FIGS. 9A-9F and the improvement in cell congestion for the simulation study of the exemplary case using cell shaping of FIGS. 10A-10F, in accordance with at least one embodiment of the present disclosure.

Figure 12:
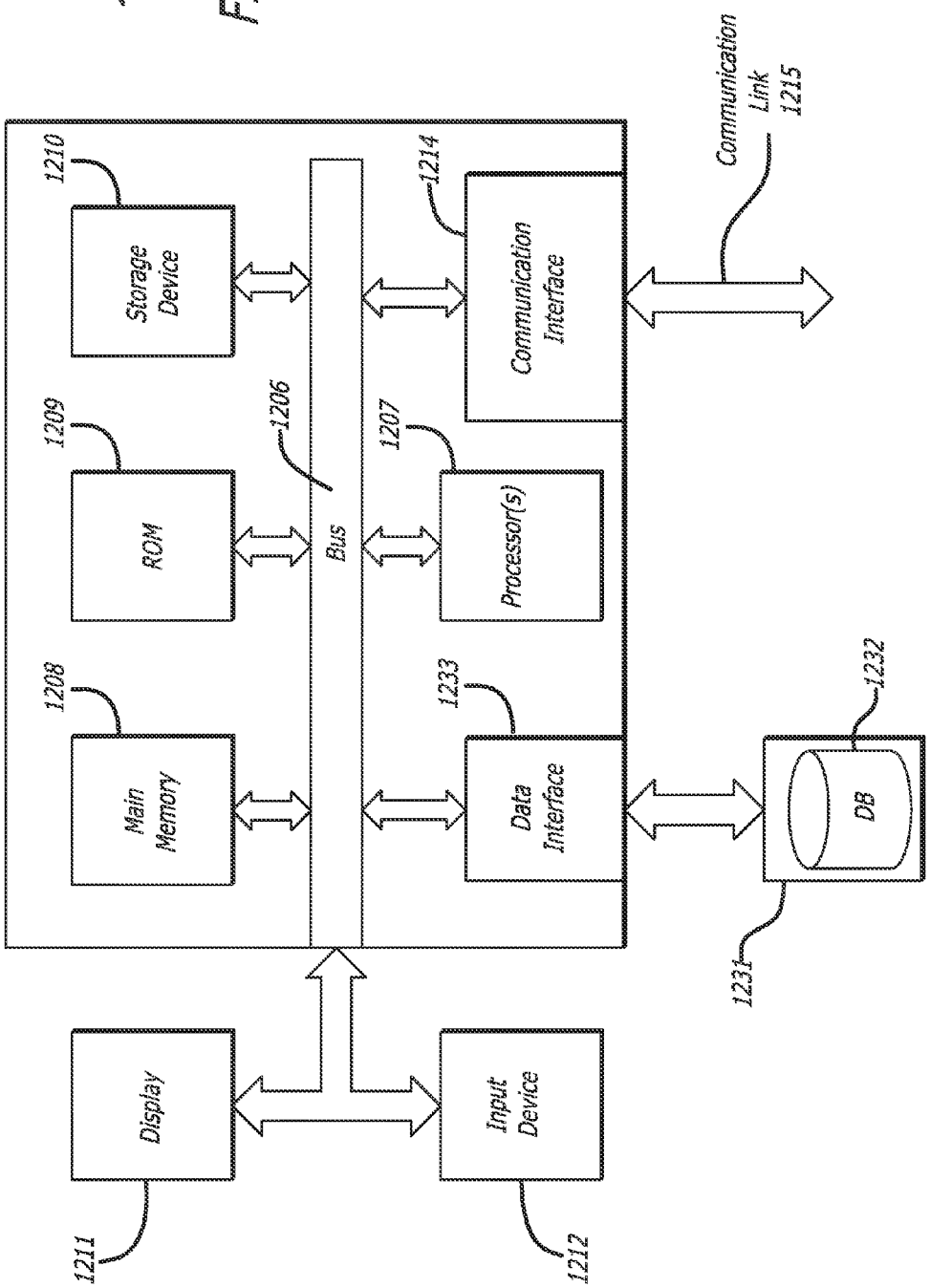

FIG. 12 illustrates a block diagram of an illustrative computing system suitable for implementing an embodiment of the present disclosure, in accordance with at least one embodiment of the present disclosure.

DESCRIPTION

The methods and apparatus disclosed herein provide an operative system for self-optimizing MSS networks. The disclosed system employs automated methods to respond to transient cell congestion epochs by using techniques such as (1) carrier shaping, (2) cell shaping, (3) cell type selection, and (4) beam shaping. Based on performance parameter data of the MSS network, RAN resources are automatically, dynamically modified locally to more efficiently satisfy local surges in demand.

Currently, network planning for MSS networks is very labor intensive with network planners developing and validating multiple resource plans; and with network operators installing, validating, and activating the static configurations associated with the resource plans. Resource plans are used to define the static configuration of MSS resources. Resource plans contain configurations for the MSS network specifying, for example, cell type; cell identification (ID); cell vertices (e.g., defined by latitude and longitude); frequency resuse of cells (e.g., denoted by colors); beamports per cell; carriers per beamport; frequencies, bandwidths, and power per carrier; terminal types (such as data terminals, handheld terminals (e.g., ruggedized terminals, smartphones, laptops, and tablets), asset tracking terminals (e.g., inconspicuous terminals), vehicular terminals, maritime terminals, and aeronautical terminals) for cells; effective isotropic radiation power (EIRP) for cells; gain over temperature (G/T) for cells; and/or data rates for cells. The labor intensive validation of the static resource plan requires additional operational cost and complexity.

The introduction of data-intensive mobile user terminals (such as smartphones, tablets, and universal serial bus (USB) MODEM-attached laptops) yields increasingly bursty traffic loads, high variability of active user locations, and an exponential increase in mobile broadband subscribers. These factors increase the likelihood of a serving cell becoming congested, while its neighboring cells remain underutilized.

The present disclosure presents a framework and collection of design tactics that enable the migration from the current practice of open loop radio resource planning (i.e. manual resource planning) to a closed loop method (i.e. automated dynamic resource planning) that targets detection and mitigation of MSS resource underutilization, while ensuring the overall stability of the MSS network. In addition to enabling the harvesting stranded network capacity, the closed loop system and method described herein enable a more streamlined MSS network planning and operations.

The waveform-agnostic framework and methods described herein anticipate the future needs of mobile network operators, while providing a key design discriminator for MSS networks supported by satellite systems and/or by terrestrial MSS systems.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with, and that the system described herein is merely one example embodiment of the present disclosure.

For the sake of brevity, conventional techniques and components related to MSS networks, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
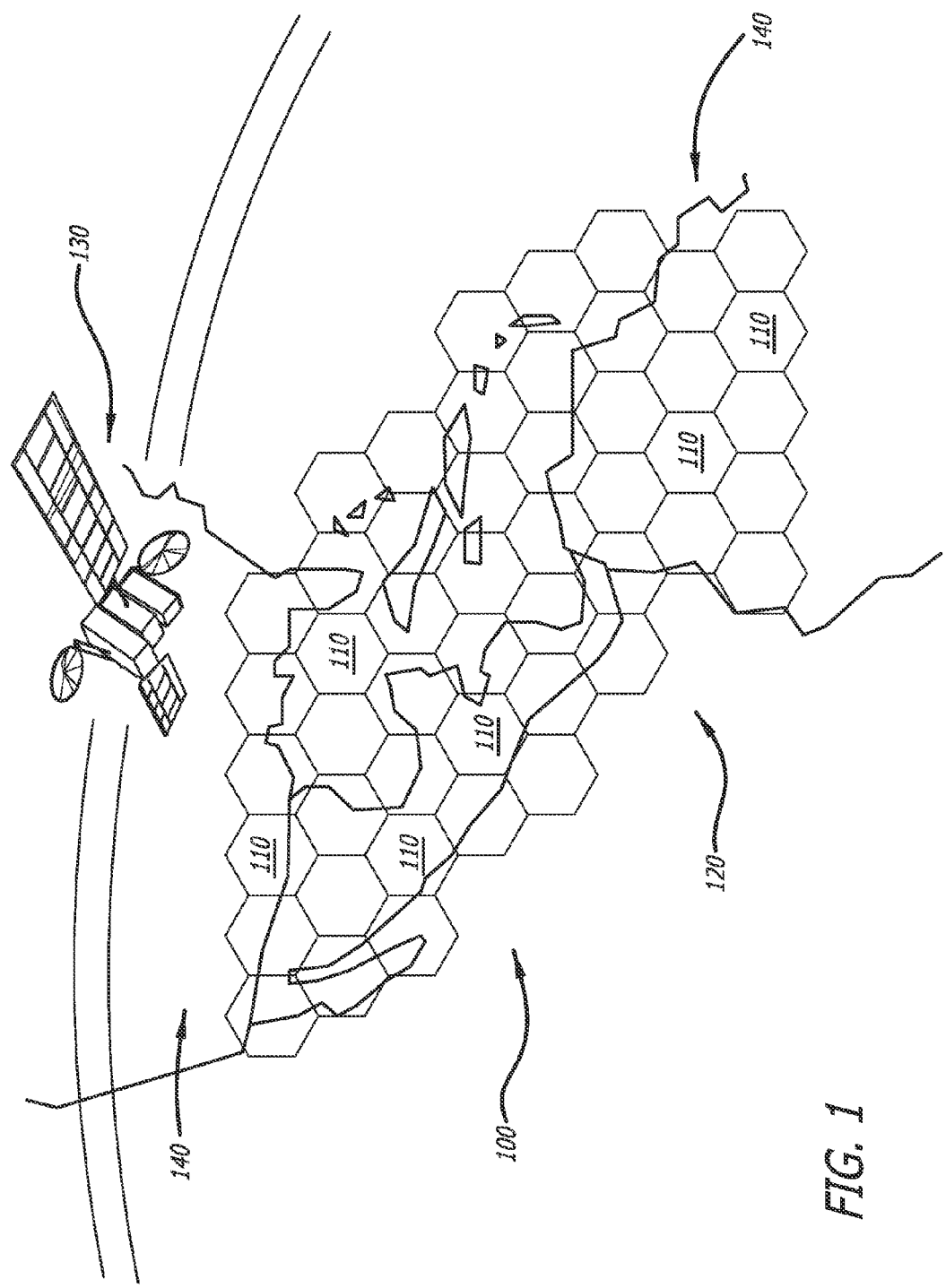
FIG. 1 is a diagram showing an exemplary MSS network that may be employed by the disclosed system and method for self-optimizing MSS resources, in accordance with at least one embodiment of the present disclosure.

FIG. 1 is a diagram 100 showing an exemplary MSS network that may be employed by the disclosed system and method for self-optimizing MSS resources, in accordance with at least one embodiment of the present disclosure. In this figure, a MSS network comprising a plurality of cells 110 is shown. Also in this figure, a satellite 130, which is part of a satellite system, is radiating the RAN antenna pattern 120 onto Earth 140. In this example, the antenna pattern 120 is radiated over Mexico, Central America, and part of South America. However, it should be noted that in other embodiments, the antenna pattern 120 may be radiated over various different areas of the Earth 140 than is shown in FIG. 1.

The satellite 130 may be part of a satellite system that comprises a constellation of satellites. The satellite 130 may be orbiting the Earth 140, for example, in a low Earth orbit (LEO) or a medium Earth orbit (MEO). In one or more embodiments, more than one satellite 130 may be used to radiate the RAN antenna pattern 120.

Figure 2:
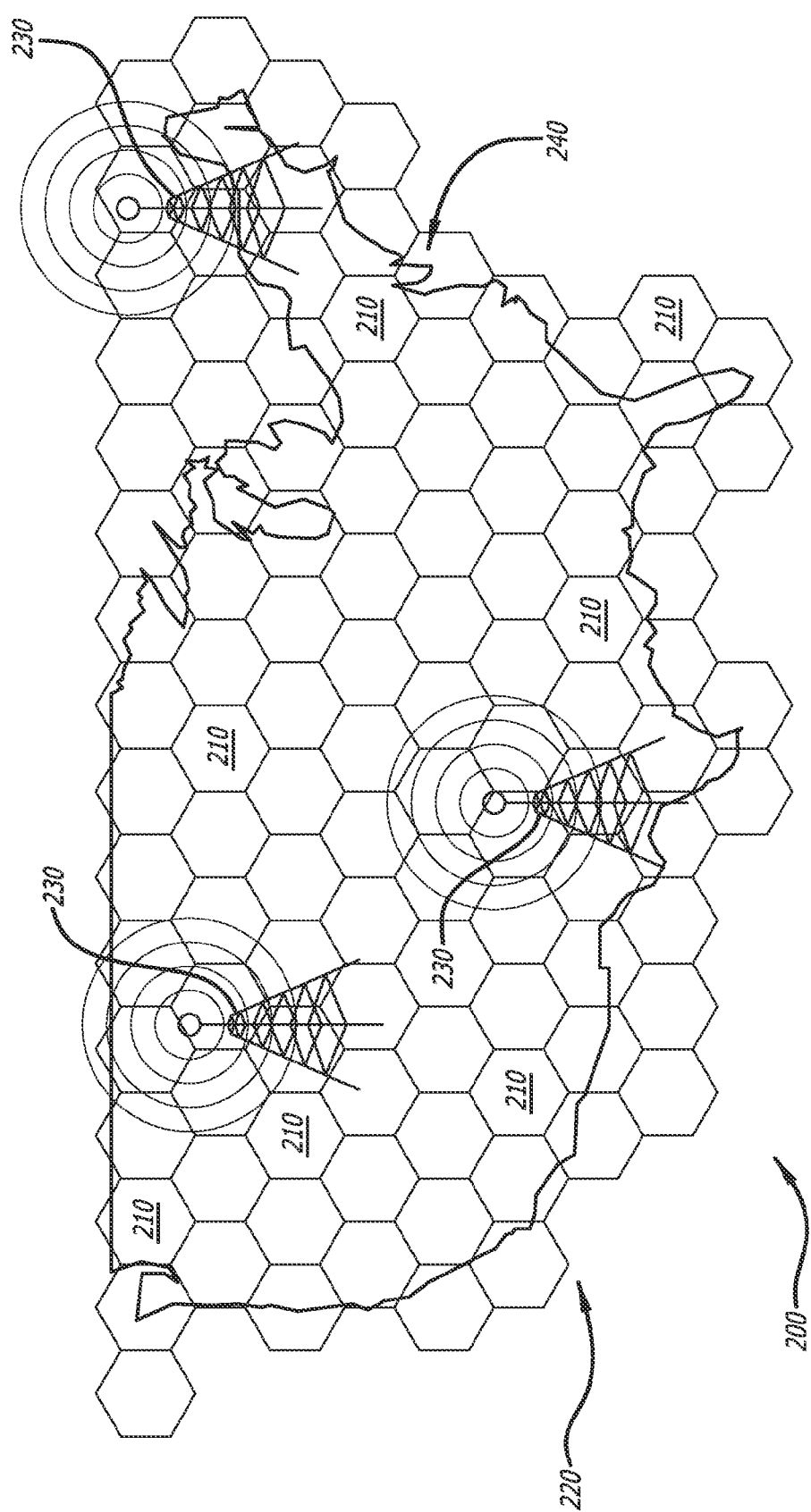
FIG. 2 is a diagram showing an exemplary cellular network supported by a terrestrial cellular system that may be employed by the disclosed system and method for self-optimizing cellular resources, in accordance with at least one embodiment of the present disclosure.

FIG. 2 is a diagram 200 showing an exemplary cellular network supported by a terrestrial cellular system that may be employed by the disclosed system and method for self-optimizing RAN resources, in accordance with at least one embodiment of the present disclosure. In this figure, a cellular network comprising a plurality of cells 210 is shown. In this example, the plurality of cells 210 are situated over the continental United States. However, it should be noted that in other embodiments, the plurality of cells 210 may be situated over various different areas of the Earth 140 than is shown in FIG. 2.

Also in this figure, a plurality of Base Station Subsystems (BSS) 230, which are part of a terrestrial cellular system, are radiating the cellular antenna pattern 220 onto Earth 240. In one or more embodiments, a single BSS 230 may be used to radiate one cell 210 or more than one cell 210 of the cellular antenna pattern 220.

Figure 3:
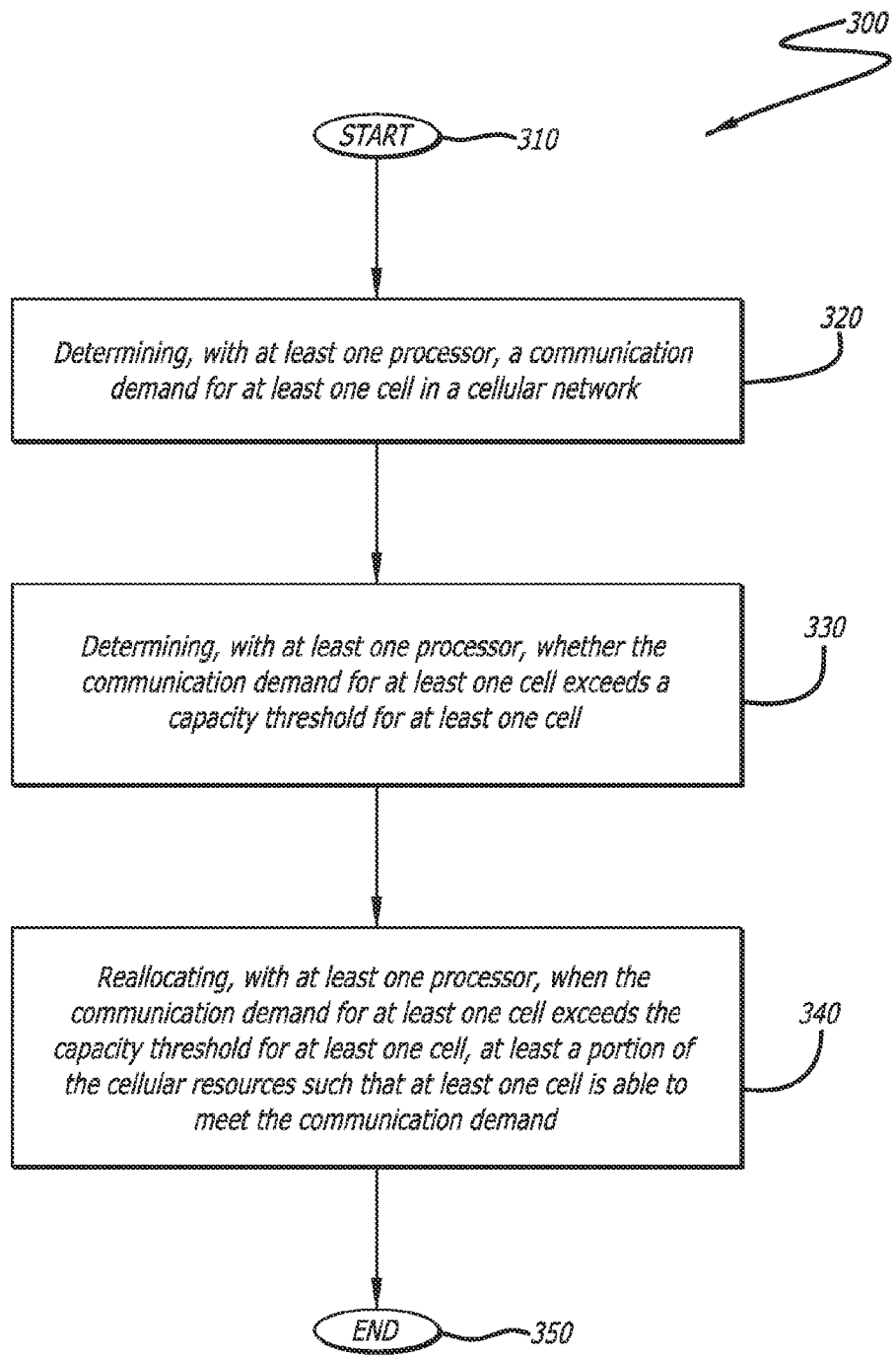
FIG. 3 depicts a flow chart depicting the disclosed method for self-optimizing MSS resources, in accordance with at least one embodiment of the present disclosure.

FIG. 3 depicts a flow chart depicting the disclosed method 300 for self-optimizing RAN resources, in accordance with at least one embodiment of the present disclosure. At the start 310 of the method 300, at least one processor determines a communication demand for at least one cell in a MSS network 320. In one or more embodiments, at least one processor is located within at least one satellite, at least one BSS, and/or at least one network operations center (NOC). Then, at least one processor determines whether the communication demand for at least one cell exceeds a capacity threshold for at least one cell 330.

When the communication demand for at least one cell exceeds the capacity threshold for at least one cell, at least one processor reallocates at least a portion of the MSS resources such that at least one cell is able to meet the communication demand 340. In one or more embodiments, at least one processor reallocates at least a portion of the MSS resources by (1) allocating a carrier from at least one adjacent cell (i.e. carrier shaping), (2) redefining a shape of at least one adjacent cell (i.e. cell shaping), (3) redefining a cell type of at least one cell (i.e. cell type selection), and/or (4) allocating greater effective isotropic radiation power (EIRP) to at least one cell and/or allocating greater gain over temperature (G/T) to at least one cell (i.e. beam shaping). Then, the method 300 ends 350.

FIG. 4 is a diagram 400 illustrating carrier shaping that may be employed by the disclosed system and method for self-optimizing MSS resources, in accordance with at least one embodiment of the present disclosure. In this figure, a RAN antenna pattern 410 is shown to comprise seven cells 420a (i.e. $N_1$, $N_2$, $N_3$, $N_5$, $N_6$, and $N_7$), 430a (i.e. $N_4$). In the RAN antenna pattern 410, cells 420a surround cell 430a and are adjacent to cell 430a.

At least one processor (which may be located within at least one satellite, at least one BSS, and/or at least one NOC) determines the communication demand (e.g., which may be related to available frequency bandwidth, data rate, and/or power) for each of the cells 420a, 430a in the RAN antenna pattern 410. At least one processor then determines whether the respective communication demand for each of the cells 420a, 430a exceeds the respective capacity threshold (e.g., which may be related to available frequency bandwidth, data rate, and/or power) for each of the cells 420a, 430a. In one or more embodiments, the capacity threshold for each of the cells 420a, 430a is predetermined. In some embodiments, the capacity threshold for each of the cells 420a, 430a can be changed dynamically over time (e.g., changed by a system operator and/or by a network operations center).

In this example, at least one processor has determined that for the cell 430a located in the center of the RAN antenna pattern 410, its communication demand exceeds its capacity threshold and, as such, the cell 430a is identified as congested. In addition, for this example, at least one processor has determined that for the cells 420a surrounding the congested cell 430a, their respective communication demand is lower than their capacity threshold and, as such, the cells 420a are identified as underutilized.

In order to relieve the congestion of the cell 430a, at least one processor performs carrier shaping 440 by allocating a number of carriers from adjacent cells 420a to cell 430a, such that cell 430b is now able to meet its communication demand and such that cells 420b are still able to meet their respective communication demands. As such, for this example, post carrier shaping 440, cells 420b (i.e. $N_1$, $N_2$, $N_3$, $N_5$, $N_6$, and $N_7$) will each have $k_1$, $k_2$, $k_3$, $k_5$, $k_6$, and $k_7$, respectively, number of less carriers and cell 430b (i.e. $N_4$) will have $\Sigma k_i$ (where i=1, 2, 3, 5, 6, 7) number of more carriers. It should be noted that in one or more embodiments, at least one processor may perform carrier shaping by allocating carriers from underutilized cells that are adjacent and/or are not directly adjacent to the congested cell.

FIG. 5 is a diagram 500 illustrating cell shaping that may be employed by the disclosed system and method for self-optimizing MSS resources, in accordance with at least one embodiment of the present disclosure. In this figure, a RAN antenna pattern 510 is shown to comprise seven cells 520a, 530a (i.e. cells $N_1$ to $N_7$). In the RAN antenna pattern 510, cells 520a (i.e. cells $N_1$-$N_3$ and $N_5$-$N_7$) surround cell 530a (i.e. cell $N_4$) and are adjacent to cell 530a. For this example, each cell 520a, 530a in the RAN antenna pattern 510 is the same cell type and, as such, each cell 520a, 530a is the same size and shape.

At least one processor (which may be located within at least one satellite, at least one BSS, and/or at least one NOC) determines the communication demand (e.g., which may be related to available frequency bandwidth, data rate, and/or power) for each of the cells 520a, 530a in the RAN antenna pattern 510. Then, at least one processor determines whether the respective communication demand for each of the cells 520a, 530a exceeds the respective capacity threshold (e.g., which may be related to available frequency bandwidth, data rate, and/or power) for each of the cells 520a, 530a. In one or more embodiments, the capacity threshold for each of the cells 520a, 530a is predetermined. In some embodiments, the capacity threshold for each of the cells 520a, 530a can be changed dynamically over time (e.g., changed by a system operator and/or by a network operations center).

In this example, at least one processor has determined that for the cell 530a located in the center of the RAN antenna pattern 510, its communication demand exceeds its capacity threshold and, as such, the cell 530a is identified as congested. In addition, for this example, at least one processor has determined that for the cells 520a surrounding the congested cell 530*a*, their respective communication demand is lower than their capacity threshold and, as such, the cells 520*a* are identified as underutilized.

In order to relieve the congestion of the cell 530*a*, at least one processor performs cell shaping 540 by enlarging cells 520*a* to cover at least a portion of the area of cell 530*a* by redefining the vertices of cells 520*a*, such that cell 530*b* is now able to meet its communication demand and such that cells 520*b* are still able to meet their respective communication demands.

It should be noted that, in this example, as shown in FIG. 5, the cells 520*a* (i.e. cells $N_1$-$N_3$ and $N_5$-$N_7$) have all been enlarged to cover portions of the area of cell 530*a* (i.e. cell $N_4$) such that the enlarged cells 520*b* (i.e. cells $N_1$-$N_3$ and $N_5$-$N_7$) symmetrically cover portions of cell 530*b* (i.e. cell $N_4$). However, it should be noted that in some embodiments for cell shaping, not all of the cells 520*a* (i.e. cells $N_1$-$N_3$ and $N_5$-$N_7$) need to be enlarged by the same amount of size (i.e. not all of the cells 520*a* need to have their vertices changed by the same amount of distance) such that the enlarged cells 520*b* cover portions of the cell 530*b* symmetrically. In one example, for these embodiments of cell shaping, one surrounding cell (e.g., 520*a* (cell $N_1$)) may have its vertices enlarged to cover a first portion of the congested cell (e.g., cell 530*a*) and another surrounding cell (e.g., 520*a* (cell $N_2$)) may have its vertices enlarged to cover a second portion of the congested cell (e.g., cell 530*a*), where the first portion is larger than the second portion and, as such, the coverage of the portions of the congested cell (e.g., cell 530*a*) are non-symmetric.

In addition, it should be noted that, in some embodiments for cell shaping, not all of the surrounding cells (e.g., cells 520*a*) of a congested cell (e.g., cell 530*a*) need to be enlarged to cover a portion of the congested cell (e.g., cell 530*a*). In one example for these embodiments for cell shaping, one surrounding cell (e.g., 520*a* (cell $N_1$)) may be enlarged to cover a portion of the congested cell (e.g., 530*a*). In another example for these embodiments of cell shaping, two surrounding cells (e.g., 520*a* (cells $N_1$ and $N_2$)) may be enlarged to cover a portion of the congested cell (e.g., 530*a*).

FIG. 6 is a diagram 600 illustrating cell type selection that may be employed by the disclosed system and method for self-optimizing MSS resources, in accordance with at least one embodiment of the present disclosure. In this figure, a RAN antenna pattern 610 is shown to comprise seven cells 620*a*, 630*a* (i.e. cells $N_1$ to $N_7$). In the RAN antenna pattern 610, cells 620*a* (i.e. cells $N_1$-$N_3$ and $N_5$-$N_7$) surround cell 630*a* (i.e. cell $N_4$) and are adjacent to cell 630*a*. For this example, each cell 620*a*, 630*a* in the RAN antenna pattern 610 is the same cell type. The cell type for the cells 620*a*, 630*a*, for this example, is a standard spot cell type.

At least one processor (which may be located within at least one satellite, at least one BSS, and/or at least one NOC) determines the communication demand (e.g., which may be related to available frequency bandwidth, data rate, and/or power) for each of the cells 620*a*, 630*a* in the RAN antenna pattern 610. At least one processor then determines whether the respective communication demand for each of the cells 620*a*, 630*a* exceeds the respective capacity threshold (e.g., which may be related to available frequency bandwidth, data rate, and/or power) for each of the cells 620*a*, 630*a*. In one or more embodiments, the capacity threshold for each of the cells 620*a*, 630*a* is predetermined. In some embodiments, the capacity threshold for each of the cells 620*a*, 630*a* can be changed dynamically over time (e.g., changed by a system operator and/or by a network operations center).

In this example, at least one processor has determined that for the cell 630*a* located in the center of the RAN antenna pattern 610, its communication demand exceeds its capacity threshold and, as such, the cell 630*a* is identified as congested.

In order to relieve the congestion of the cell 630*a*, at least one processor performs cell type selection 640 by handing over a portion of the terminals in cell 630*a* to an overlapping cell 650 of a larger cell type (e.g., a regional cell type), such that cell 630*b* is now able to meet its communication demand.

FIGS. 7A, 7B, and 7C are diagrams showing different exemplary cell types that may be used for the cell type selection of FIG. 6, in accordance with at least one embodiment of the present disclosure. In particular, FIG. 7A illustrates an exemplary cell type of standard spot cells 710, FIG. 7B illustrates an exemplary cell type of microcells 720, and FIG. 7C illustrates an exemplary cell type of regional cells 730.

FIGS. 8A and 8B are diagrams illustrating beam shaping that may be employed by the disclosed system and method for self-optimizing MSS resources, in accordance with at least one embodiment of the present disclosure. In Particular, FIG. 8A depicts a Beam Weight Generator 800, and FIG. 8B shows an exemplary RAN antenna pattern 810 comprising a plurality of cells 820. For this example, the cells 820 are shown to have various effective isotropic radiation power (EIRP) in dBi, as shown in beam pattern 830. Also for this example, the cells 820 employ a seven (7) color frequency reuse scheme 840. Each "color" represents a specific predetermined frequency band.

At least one processor (which may be located within at least one satellite, at least one BSS, and/or at least one NOC) determines the communication demand (e.g., which may be related to available frequency bandwidth, data rate, and/or power) for each of the cells 820 in the RAN antenna pattern 810. At least one processor then determines whether the respective communication demand for each of the cells 820 exceeds the respective capacity threshold (e.g., which may be related to available frequency bandwidth, data rate, and/or power) for each of the cells 820. In one or more embodiments, the capacity threshold for each of the cells 820 is predetermined. In some embodiments, the capacity threshold for each of the cells 820 can be changed dynamically over time (e.g., changed by a system operator and/or by a network operations center).

In this example, if at least one processor has determined that a cell 820 located within the RAN antenna pattern 810 has a communication demand that exceeds its capacity threshold, then that cell 820 is identified as congested. In addition, if at least one processor has determined that other cells 820 surrounding the congested cell 820 have a respective communication demand that is lower than their respective capacity threshold, then the cells 820 are identified as underutilized.

If a cell (or beam) 820 is found to be congested and sufficient power is available in the system (i.e. at least one cell 820 is underutilized), the Target (aggregate) carrier over interference (C/I) input 850 to the Beam Forming Network (BFN) beam weight generator function 800 can be modified to increase the spectral efficiency of the congested beam 820. This will have the effect of increasing beam gain for users in the congested cell 820 with a slight degradation being imposed for users at the edge of the coverage area of the cell pattern 810. The beam weight generator 800, with the assistance of a beam weight generator tool 880 and/or a system engineer 890, is able to produce the new beamweight coefficients 895 by utilizing feed patterns 810, mainlobe gain 860, Target C/I 850, the cell pattern 870, and the frequency reuse pan 840.

Alternately, when a cell (or beam) 820 is found to be congested, the reuse distance 897 can be increased, for example, from a four (4) color reuse scheme to a seven (7) color reuse scheme, or from a 7 color reuse scheme to a twenty-eight (28) color reuse scheme. This has the overall effect of increasing beam 820 gain due to a decrease in interference experienced by users at the edge of the cell or beam coverage 810.

It should be noted that in one or more embodiments, at least one processor may perform beam shaping by allocating EIRP from underutilized cells that are adjacent and/or are not directly adjacent to the congested cell. Additionally, it should also be noted that in other embodiments, at least one processor may perform beam shaping by allocating gain over temperature (G/T) dB/W from underutilized cells that are adjacent and/or are not directly adjacent to the congested cell.

Figure 9A:
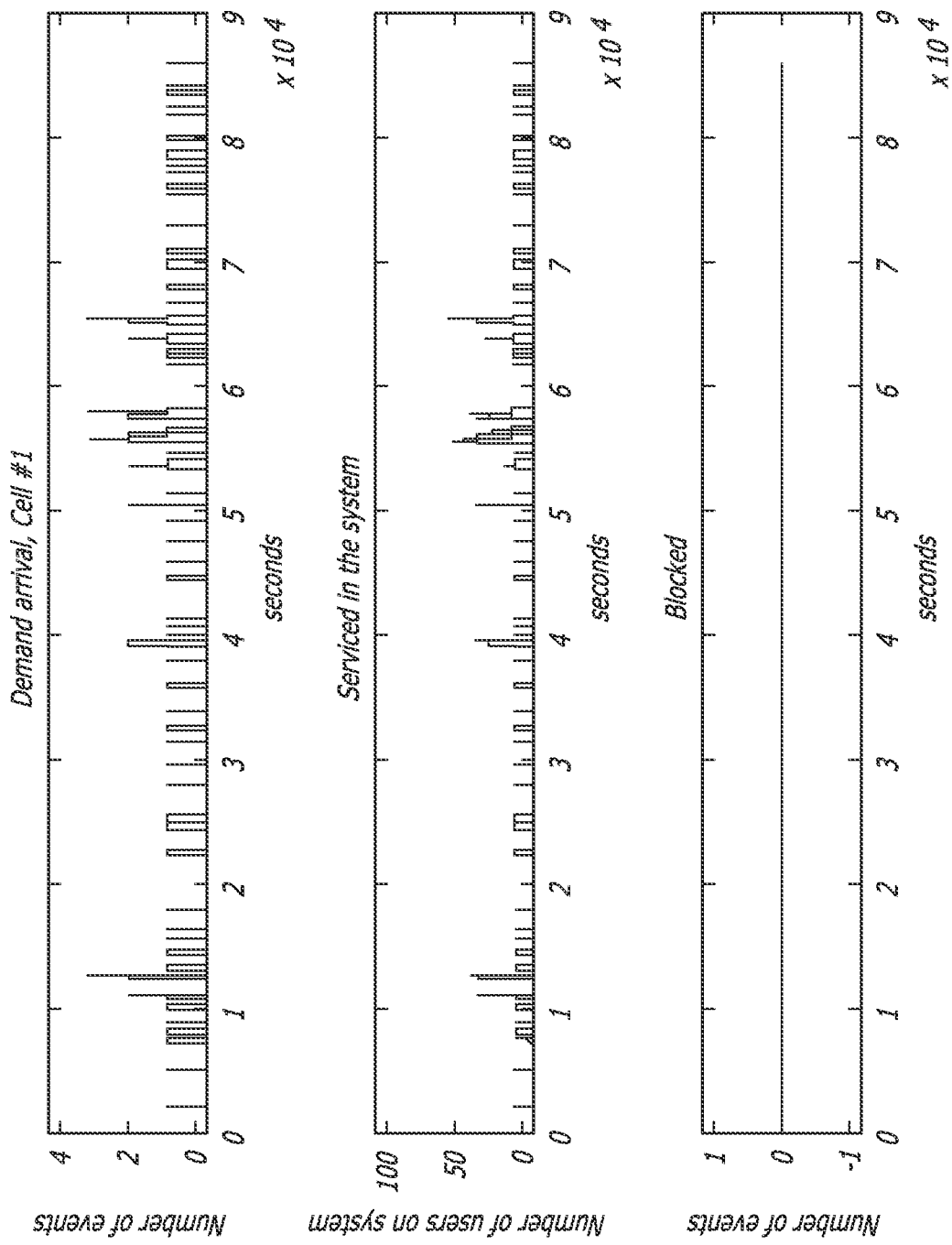
Figure 9B:
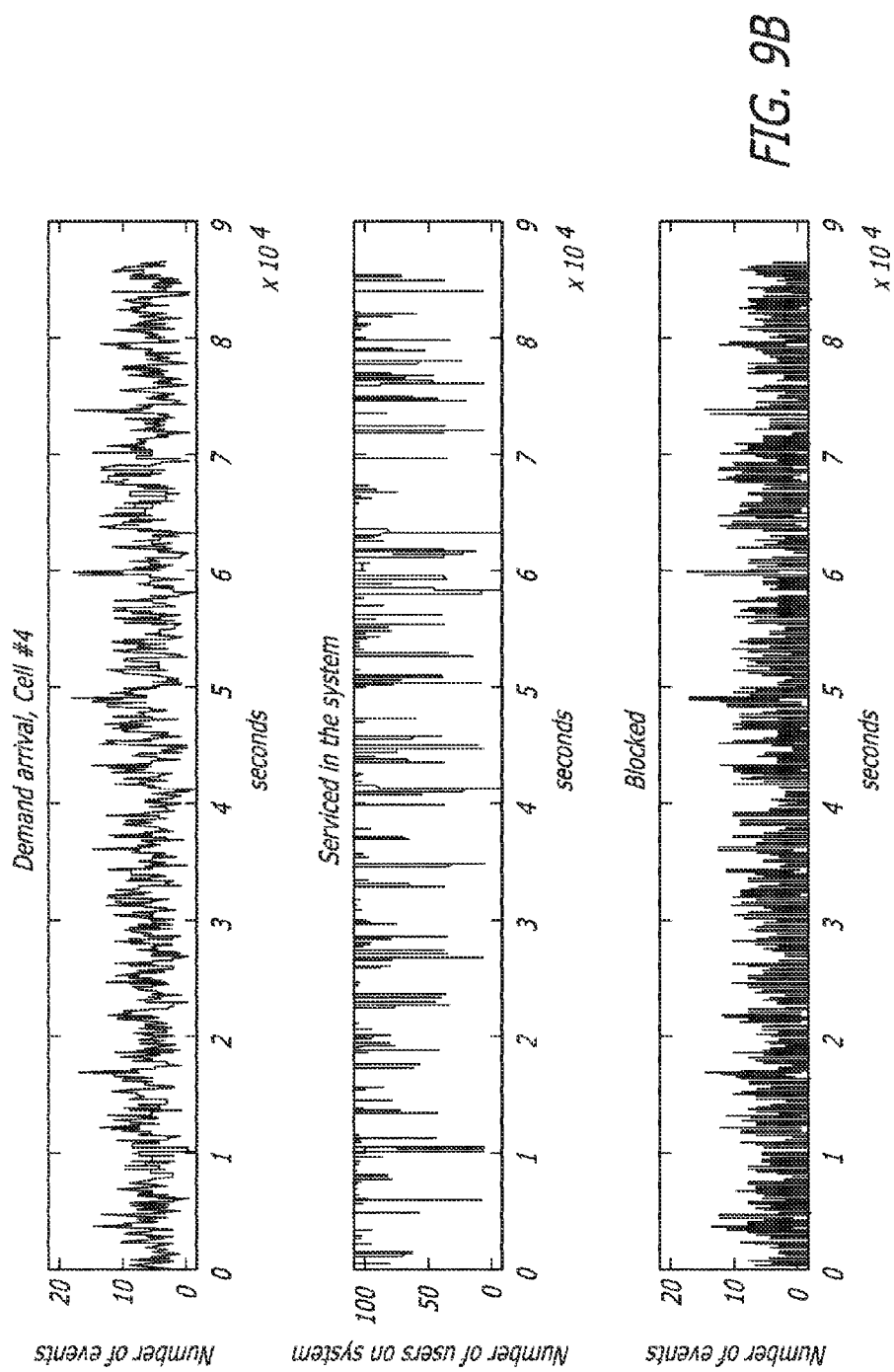
Figure 9C:
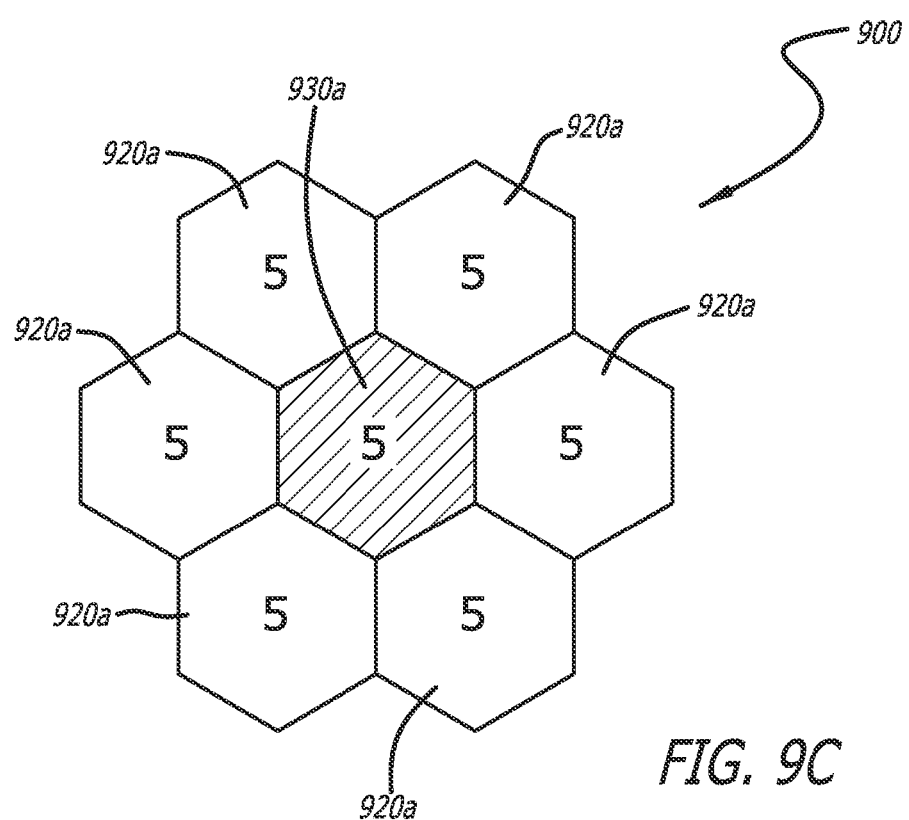
Figure 9D:
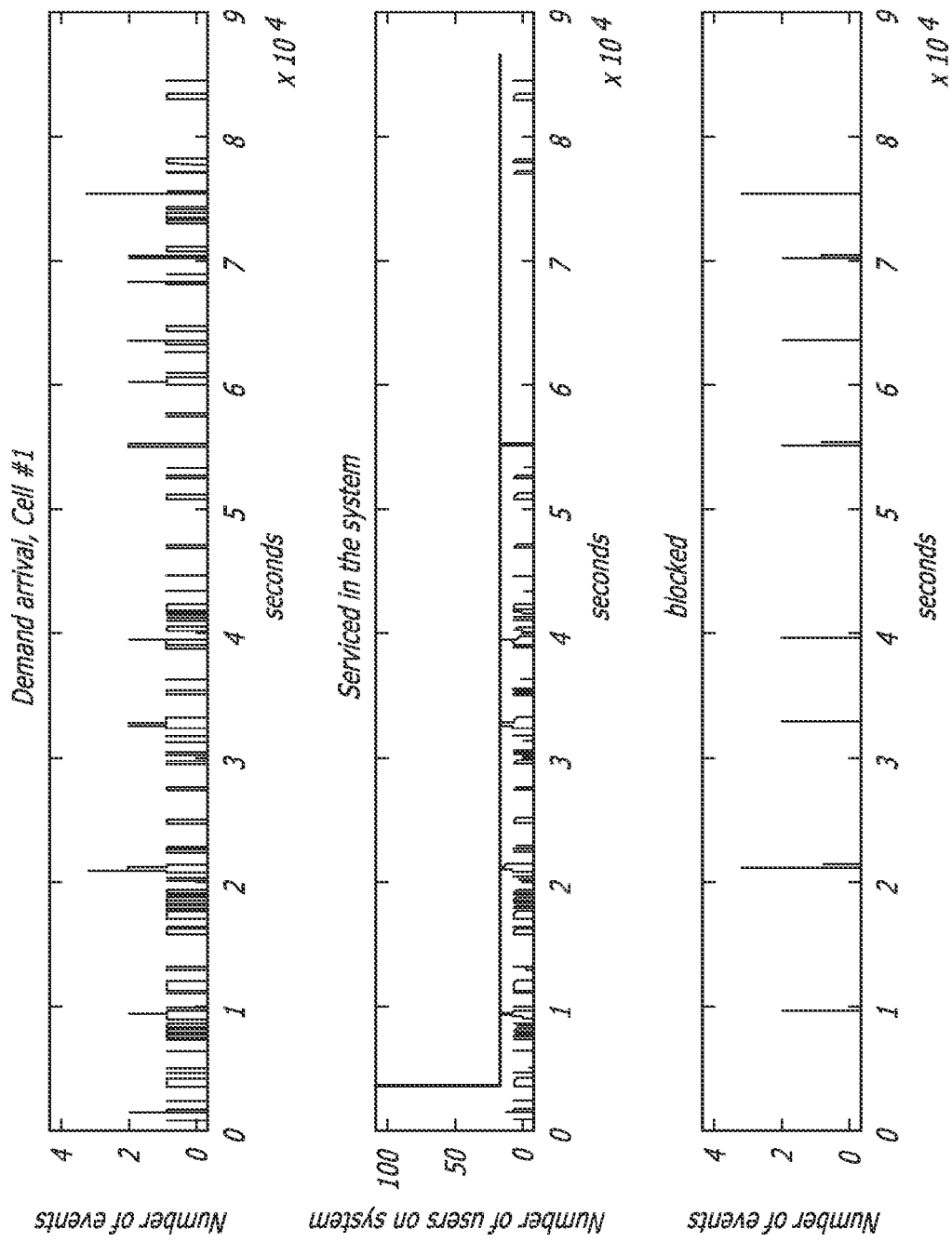
Figure 9E:
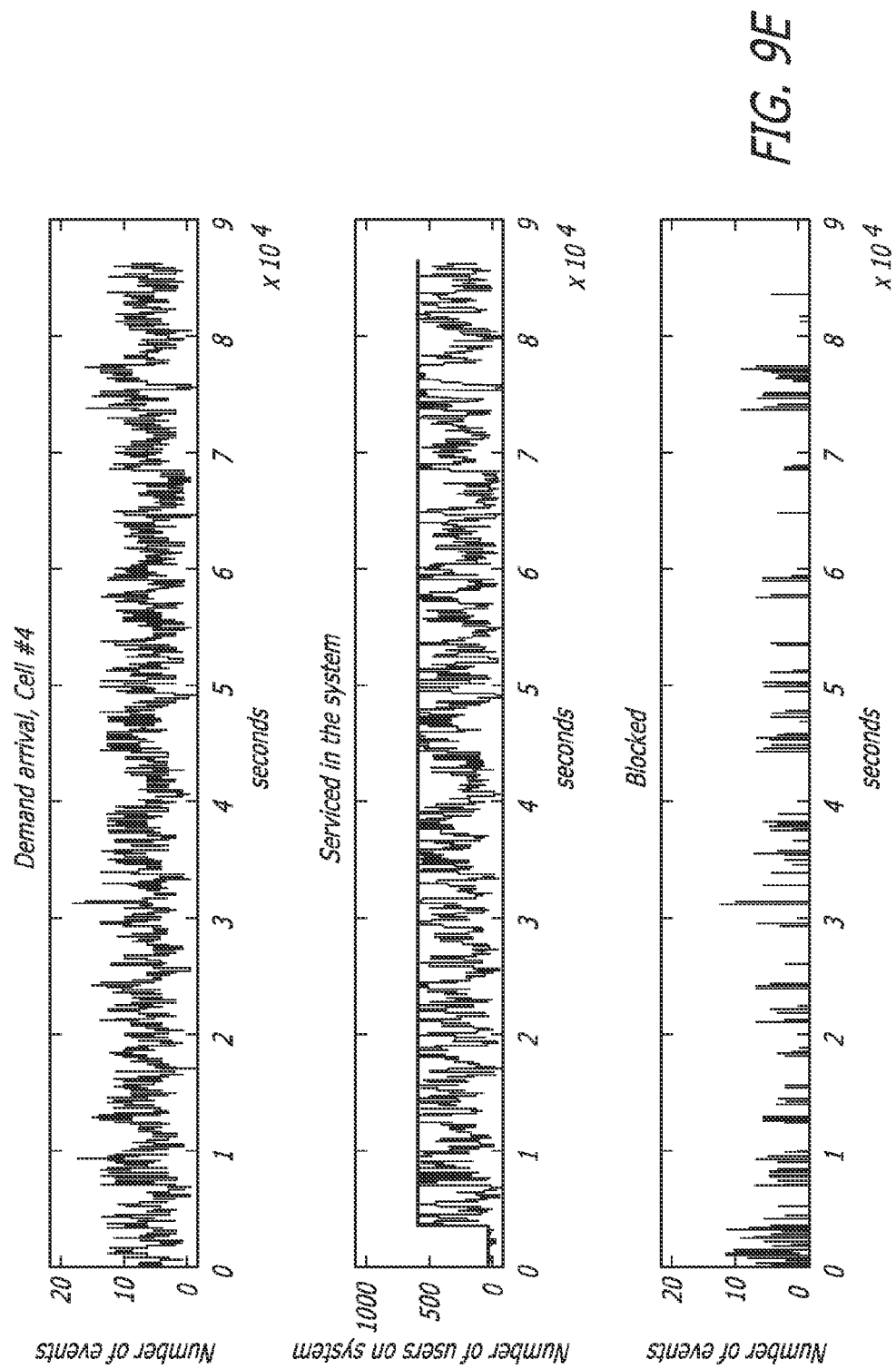
Figure 9F:
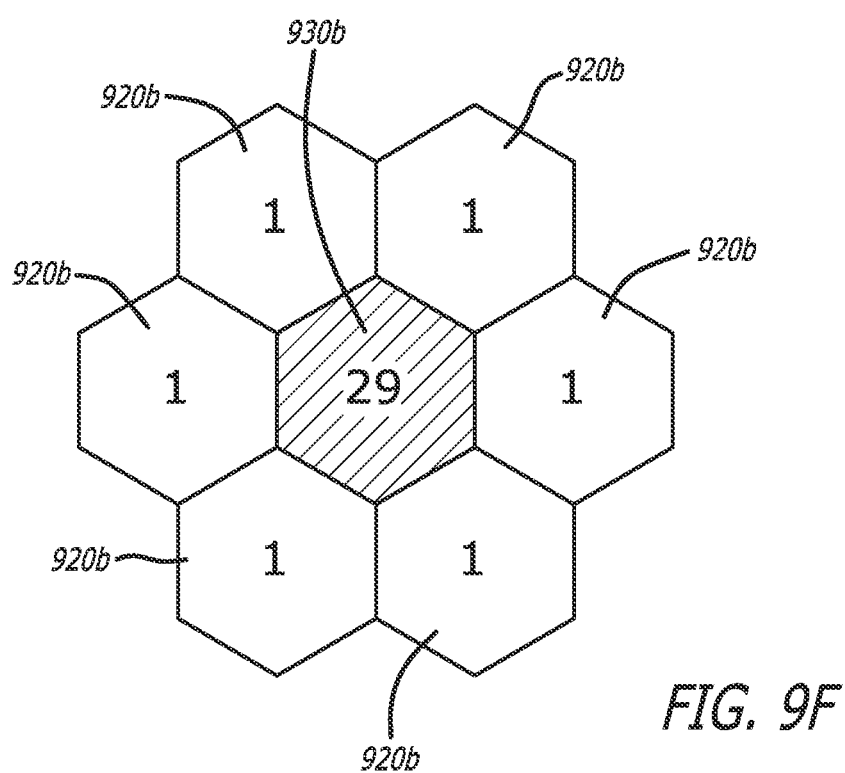

FIGS. 9A-9F show data for a simulation study of an exemplary case using carrier shaping of FIG. 4, in accordance with at least one embodiment of the present disclosure. In particular, FIG. 9C shows the exemplary RAN antenna pattern 900 used for the simulation study. The RAN antenna pattern 900 is shown to comprise seven cells 920a, 930a. In the RAN antenna pattern 900, cells 920a surround cell 930a and are adjacent to cell 930a. Cell 930a is determined to be congested, and cells 920a are determined to be underutilized. For the simulation study, a normal distribution of five (5) carriers was assigned to each cell 920a, 930a in the RAN antenna pattern 900. In addition, each carrier had 20 subscribers. In order to relieve the congestion of the cell 930a, during carrier shaping, four (4) carriers were allocated from each adjacent cell 920a to cell 930a. And, FIG. 9F shows the distribution of carriers for each of the cells 920b, 930b post carrier shaping (i.e. cells 920b each have one (1) carrier and cell 930b has twenty-nine (29) carriers).

In addition, FIG. 9A shows the graphs containing the simulation data for the uncongested cell 930a prior to carrier shaping, FIG. 9B shows graphs containing the simulation data for a congested cell 920a prior to carrier shaping, FIG. 9D shows graphs containing the simulation data for the uncongested cell 920b post carrier shaping, and FIG. 9E shows graphs containing the simulation data for the congested cell 930b post carrier shaping. The simulation study results show that post carrier shaping, call blocking decreased from 42.6% to 3.68%, the aggregate number of sessions increased from 112 to 335, and the aggregate utilization increased from 16% to 47.89%.

Figure 10A:
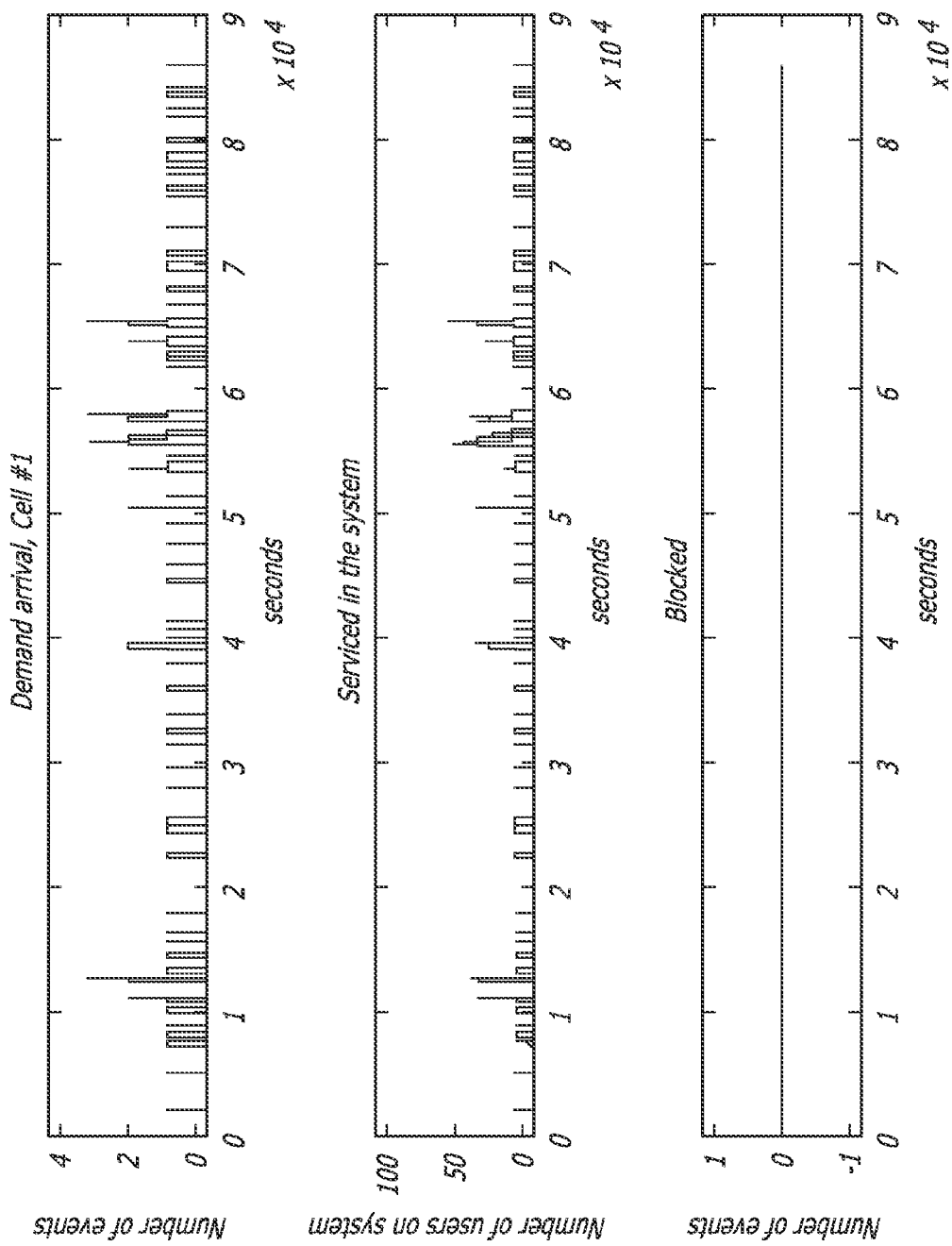
Figure 10B:
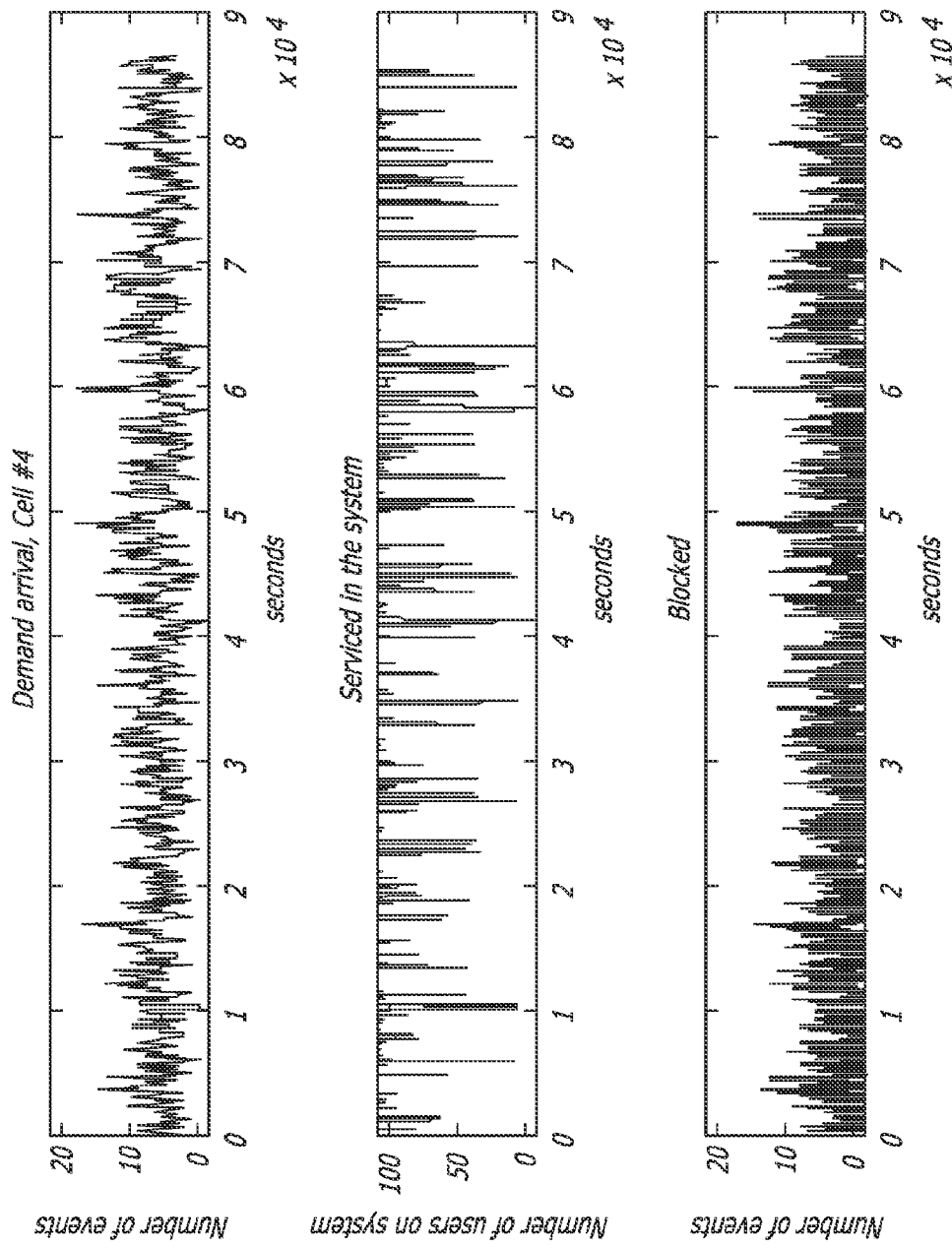
Figure 10C:
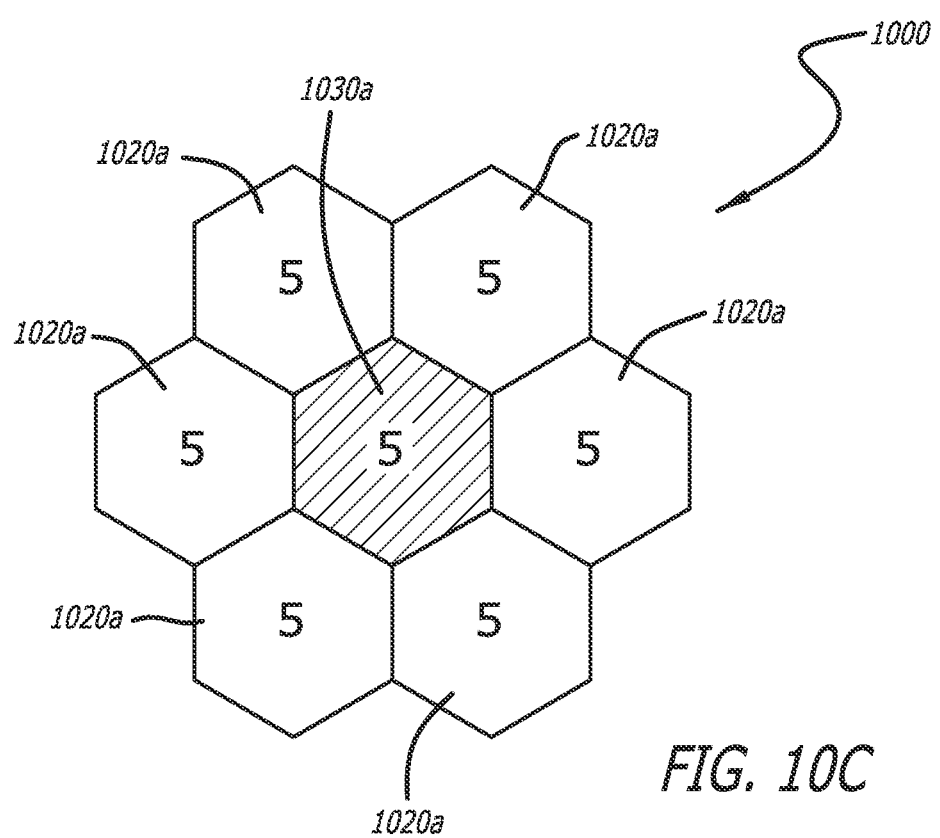
Figure 10D:
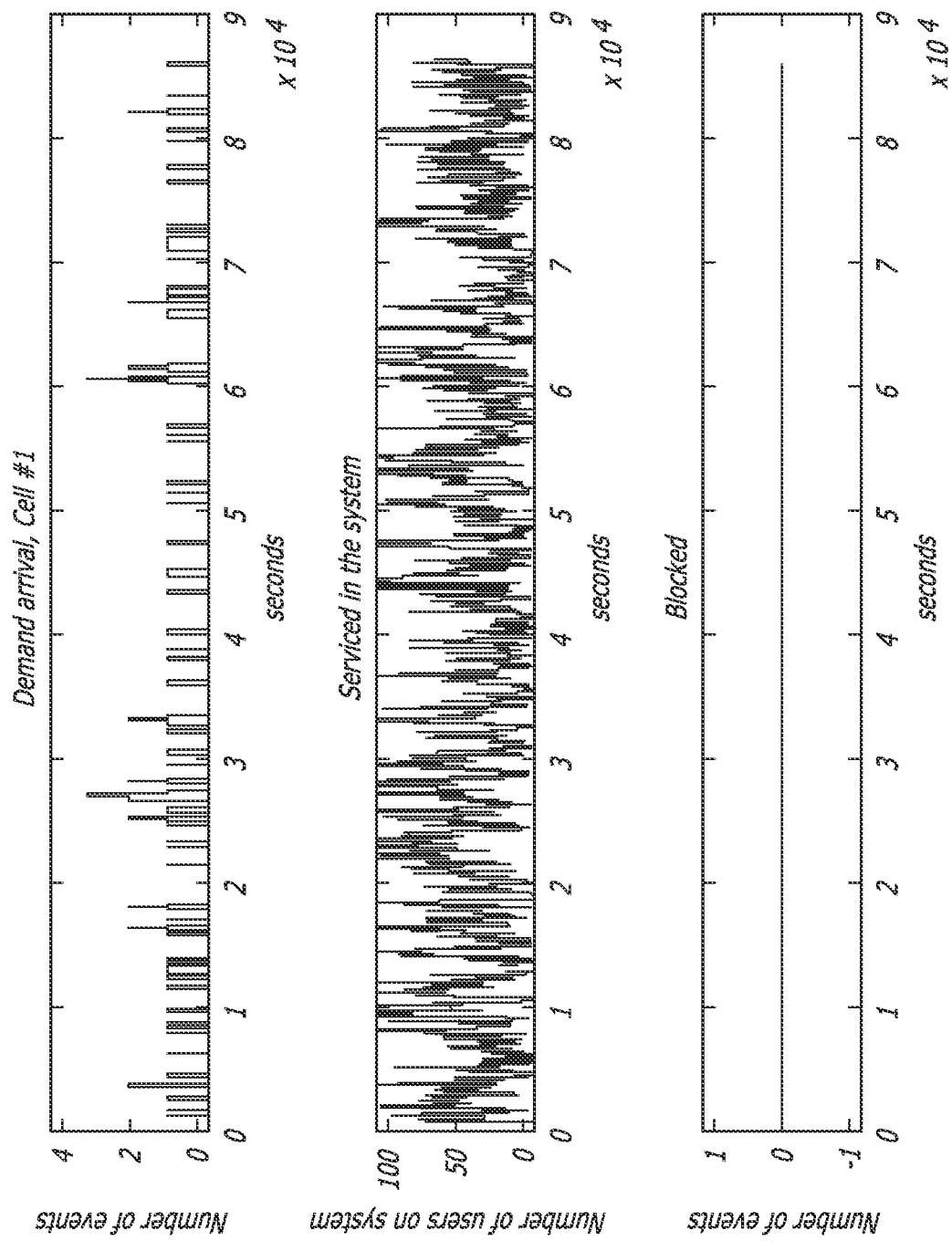
Figure 10E:
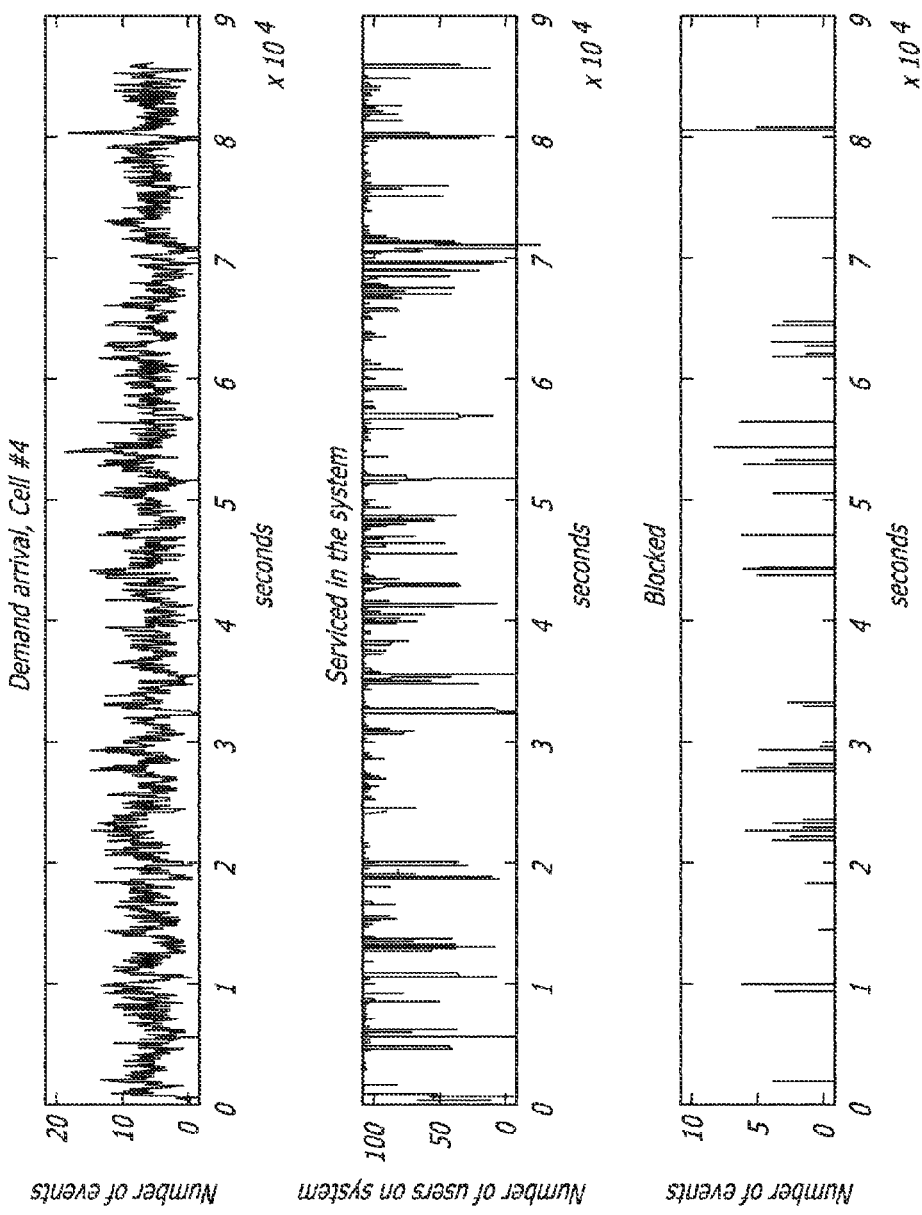
Figure 10F:
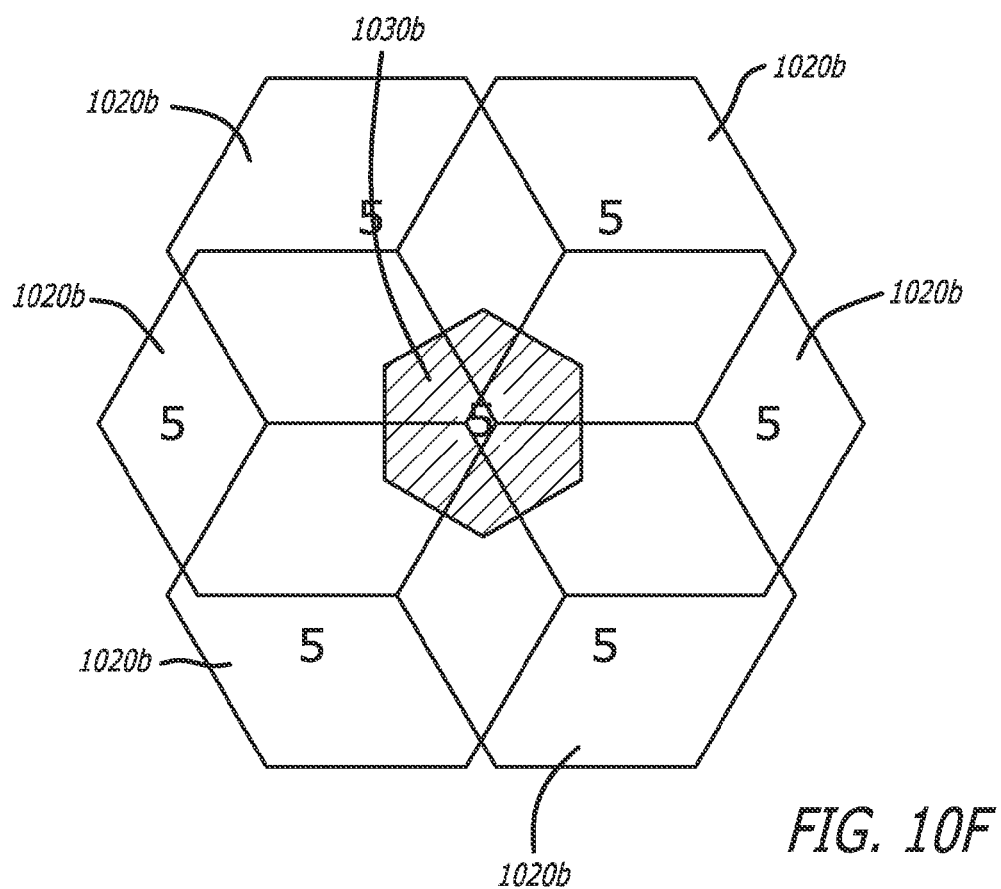

FIGS. 10A-10F show data for a simulation study of an exemplary case using cell shaping of FIG. 5, in accordance with at least one embodiment of the present disclosure. In particular, FIG. 10C shows the exemplary RAN antenna pattern 1000 used for the simulation study. The RAN antenna pattern 1000 is shown to comprise seven cells 1020a, 1030a. In the RAN antenna pattern 1000, cells 1020a surround cell 1030a and are adjacent to cell 1030a. Cell 1030a is determined to be congested, and cells 1020a are determined to be underutilized. For the simulation study, a normal distribution of five (5) carriers was assigned to each cell 1020a, 1030a in the RAN antenna pattern 1000. In addition, each carrier had 20 subscribers. In order to relieve the congestion of the cell 1030a, during cell shaping, cells 1020a are enlarged to cover the area of cell 1030a by redefining the vertices of cells 1020a. FIG. 10F shows that cells 1020b cover the area of cell 1030b.

In addition, FIG. 10A shows the graphs containing the simulation data for the uncongested cell 1030a prior to cell shaping, FIG. 10B shows graphs containing the simulation data for a congested cell 1020a prior to cell shaping, FIG. 10D shows graphs containing the simulation data for the uncongested cell 1020b post cell shaping, and FIG. 10E shows graphs containing the simulation data for the congested cell 1030b post cell shaping. The simulation study results show that post cell shaping, call blocking decreased from 42.6% to 1.38%, the aggregate number of sessions increased from 112 to 349, and the aggregate utilization increased from 16% to 49.86%.

FIG. 11 is a table 1100 showing a summary of the improvement in cell congestion for the simulation study of the exemplary case using carrier shaping of FIGS. 9A-9F and the improvement in cell congestion for the simulation study of the exemplary case using cell shaping of FIGS. 10A-10F, in accordance with at least one embodiment of the present disclosure. In this figure, the table 1100 shows that the baseline call blocking percentage of 42.60% decreased to 3.68% when carrier shaping was implemented and to 1.38% when cell shaping was implemented. The table 1100 also shows that the baseline throughput of total sessions of 112 increased to 335 sessions when carrier shaping was implemented and to 349 sessions when cell shaping was implemented. Also, the table 1100 shows that the baseline total utilization capacity of 16.00% increased to 47.89% when carrier shaping was implemented and to 49.86% when cell shaping was implemented.

It should be noted that, in one or more embodiments, the disclosed system and method for self-optimizing MSS resources may employ one or more than one of the disclosed four techniques (i.e. (1) carrier shaping, (2) cell shaping, (3) cell type selection, and (4) beam shaping) in order to relieve congestion of a congested cell. For an example, in some embodiments, the disclosed system and method may employ the techniques of carrier shaping and cell shaping in conjunction together to relieve congestion of a congested cell. In another example, in some embodiments, the disclosed system and method may employ the techniques of cell shaping and beam shaping in conjunction together to relieve congestion of a congested cell.

FIG. 12 illustrates a block diagram of an illustrative computing system 1200 suitable for implementing an embodiment of the present disclosure, in accordance with at least one embodiment of the present disclosure. For example, at least one processor (which may be located within at least one satellite, at least one BSS, and/or at least one NOC) of the disclosed system for self-optimizing MSS resources may include and/or employ at least a portion of the disclosed computer system 1200. Computing system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control (not shown).

According to one embodiment of the present disclosure, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the present disclosure. Thus, embodiments of the present disclosure are not limited to any specific combination of hardware circuitry and/or software. In one embodiment, the term "logic" shall mean any combination of software or hardware that is used to implement all or part of the present disclosure.

The term "computer readable medium" or "computer usable medium" as used herein refers to any medium that participates in providing instructions to processor 1207 for execution. Such a medium may take many forms, including but not limited to, non-volatile media, volatile media, and transmission media. Non-volatile media includes, for example, optical or magnetic disks, such as disk drive 1210. Volatile media includes dynamic memory, such as system memory 1208.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the present disclosure, execution of the sequences of instructions to practice the present disclosure is performed by a single computer system 1200. According to other embodiments of the present disclosure, two or more computer systems 1200 coupled by communication link 1215 (e.g., LAN, PTSN, or wireless network) may perform the sequence of instructions required to practice the present disclosure in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. Computer system 1200 may also interact with a database 1232 within a database system 1231 via a data interface 1233 where the computer system 1200 may store and retrieve information or data of the electronic design into and from the database system 1231.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for self-optimizing mobile system resources, the method comprising:
    determining, by at least one processor, a communication demand for at least one cell in a network, wherein the at least one cell is a polygon shape and at least one adjacent cell to the at least one cell is a polygon shape;
    determining, by the at least one processor, that the communication demand for the at least one cell exceeds a capacity threshold for the at least one cell; and
    reallocating, by the at least one processor, based on the determining of the communication demand for the at least one cell exceeds the capacity threshold for the at least one cell, at least a portion of the mobile system resources by redefining at least one vertex of the at least one adjacent cell to enlarge the at least one adjacent cell, according to how much the communication demand exceeds the capacity threshold for the at least one cell, such that at least a portion of the at least one adjacent cell covers at least a portion of the at least one cell and such that the respective communication demand for the at least one cell and the at least one adjacent cell is met;
    wherein the reallocating of the at least a portion of the mobile system resources comprises allocating greater effective isotropic radiation power (EIRP) to the at least one cell.

2. The method of claim 1, wherein the reallocating of the at least a portion of the mobile system resources comprises allocating at least one communication resource from at least one adjacent cell to the at least one cell.

3. The method of claim 1, wherein the reallocating of the at least a portion of the mobile system resources comprises redefining a cell type of the at least one cell.

4. The method of claim 3, wherein the cell type is one of a standard spot cell, a micro cell, or a regional cell.

5. The method of claim 3, wherein the cell type comprises at least one of cells of a same size and cells of different sizes.

6. The method of claim 1, wherein the reallocating of the at least a portion of the mobile system resources comprises allocating greater gain over temperature (G/T) to the at least one cell.

7. The method of claim 1, wherein the capacity threshold for the at least one cell is related to available frequency bandwidth of the at least one cell.

8. The method of claim 1, wherein the capacity threshold for the at least one cell is predetermined.

9. The method of claim 1, wherein the at least one cell may be one of a regular shape or an irregular shape,
    wherein the regular shape comprises at least one of sides of identical lengths or angles of identical sizes, and
    wherein the irregular shape comprises at least one of sides of different lengths or angles of different sizes.

10. The method of claim 1, wherein the reallocating of the at least a portion of the mobile system resources occurs without a handover event.

11. A system for self-optimizing mobile system resources, the system comprising:

at least one processor to determine a communication demand for at least one cell in a network, wherein the at least one cell is a polygon shape and at least one adjacent cell to the at least one cell is a polygon shape; to determine that the communication demand for the at least one cell exceeds a capacity threshold for the at least one cell; and to reallocate, based on the determining of the communication demand for the at least one cell exceeds the capacity threshold for the at least one cell, at least a portion of the mobile system resources, wherein the at least one processor is to reallocate the at least a portion of the mobile system resources by redefining at least one vertex of the at least one adjacent cell to enlarge the at least one adjacent cell, according to how much the communication demand exceeds the capacity threshold for the at least one cell, such that at least a portion of the at least one adjacent cell covers at least a portion of the at least one cell and such that the respective communication demand for the at least one cell and the at least one adjacent cell is met;

wherein the at least one processor is to reallocate the at least a portion of the mobile system resources by allocating greater effective isotropic radiation power (EIRP) to the at least one cell.

12. The system of claim 11, wherein when the at least one processor is to reallocate the at least a portion of the mobile system resources, the at least one processor is to allocate at least one communication resource from at least one adjacent cell to the at least one cell.

13. The system of claim 11, wherein when the at least one processor is to reallocate the at least a portion of the mobile system resources, the at least one processor is to redefine a cell type of the at least one cell.

14. The system of claim 13, wherein the cell type is one of a standard spot cell, a micro cell, or a regional cell.

15. The method of claim 1, wherein the communication demand is related to at least one of frequency bandwidth, data rate, or power.

16. The method of claim 1, wherein when there are at least two of the adjacent cells that are redefined, each of the adjacent cells are enlarged by a same amount of size to cover the at least a portion of the at least one cell.

17. The method of claim 1, wherein when there are at least two of the adjacent cells that are redefined, at least two of the adjacent cells that are redefined are enlarged by a different amount of size to cover the at least a portion of the at least one cell.

18. The method of claim 1, wherein the reallocating of the at least a portion of the mobile system resources further comprises allocating at least one carrier from the at least one adjacent cell to the at least one cell.

* * * * *